July 21, 1964  P. G. McCARTHY ET AL  3,141,316
PATTERN CONTROL MECHANISMS
Filed July 6, 1960  20 Sheets-Sheet 1

Inventors
Patrick Gideon McCarthy
Derrick Edward Hewitt
By
Michael S. Striker
Attorney

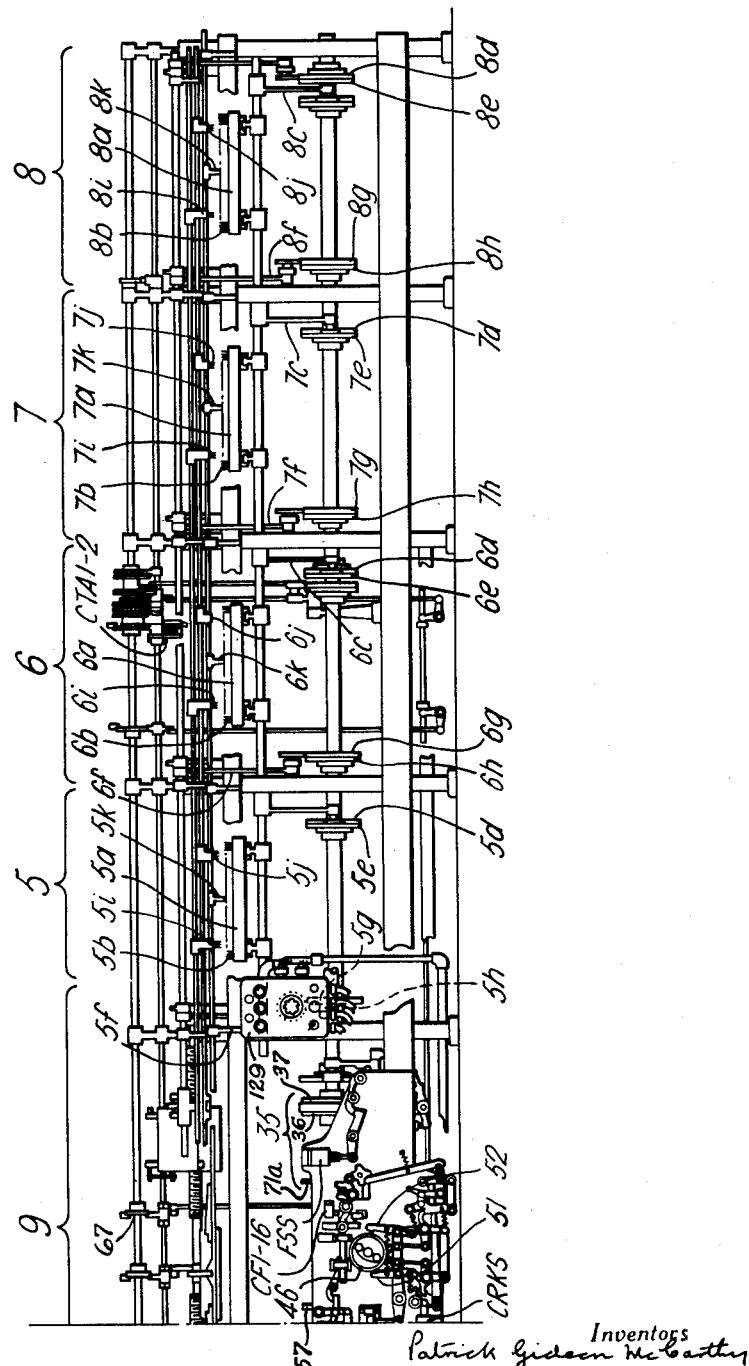

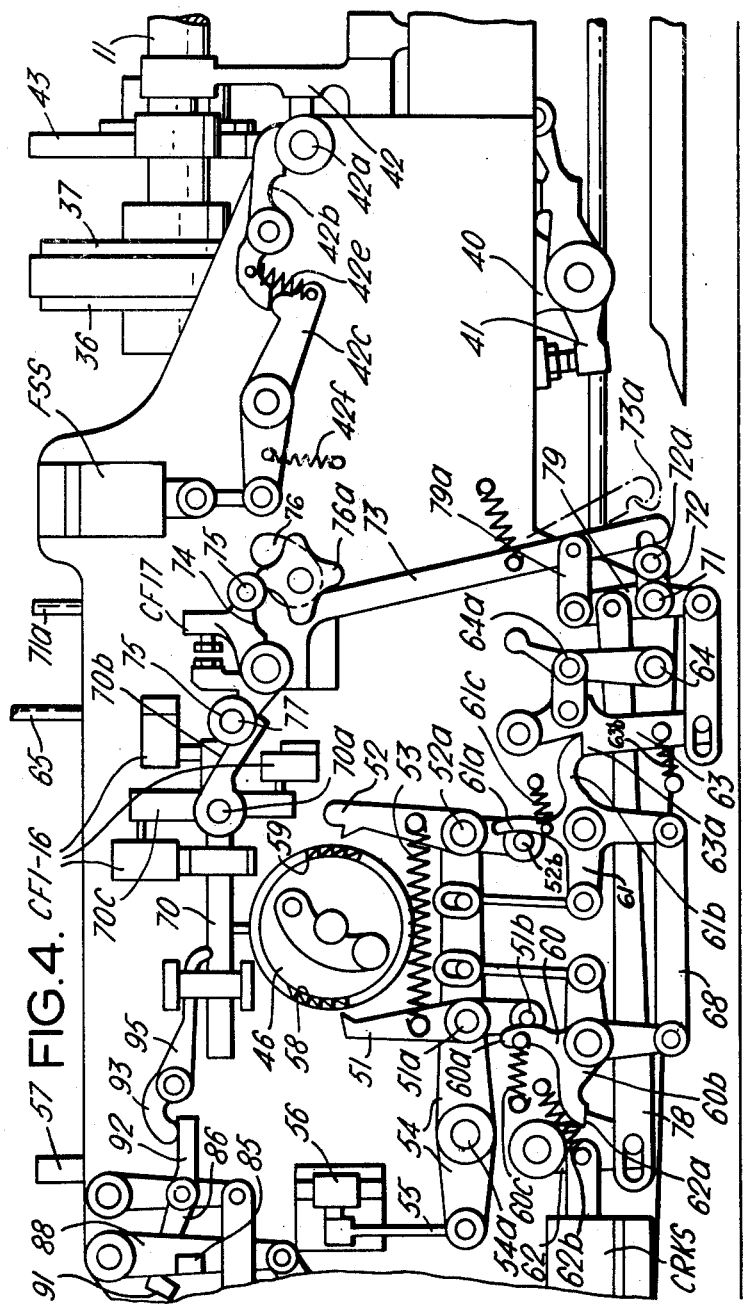

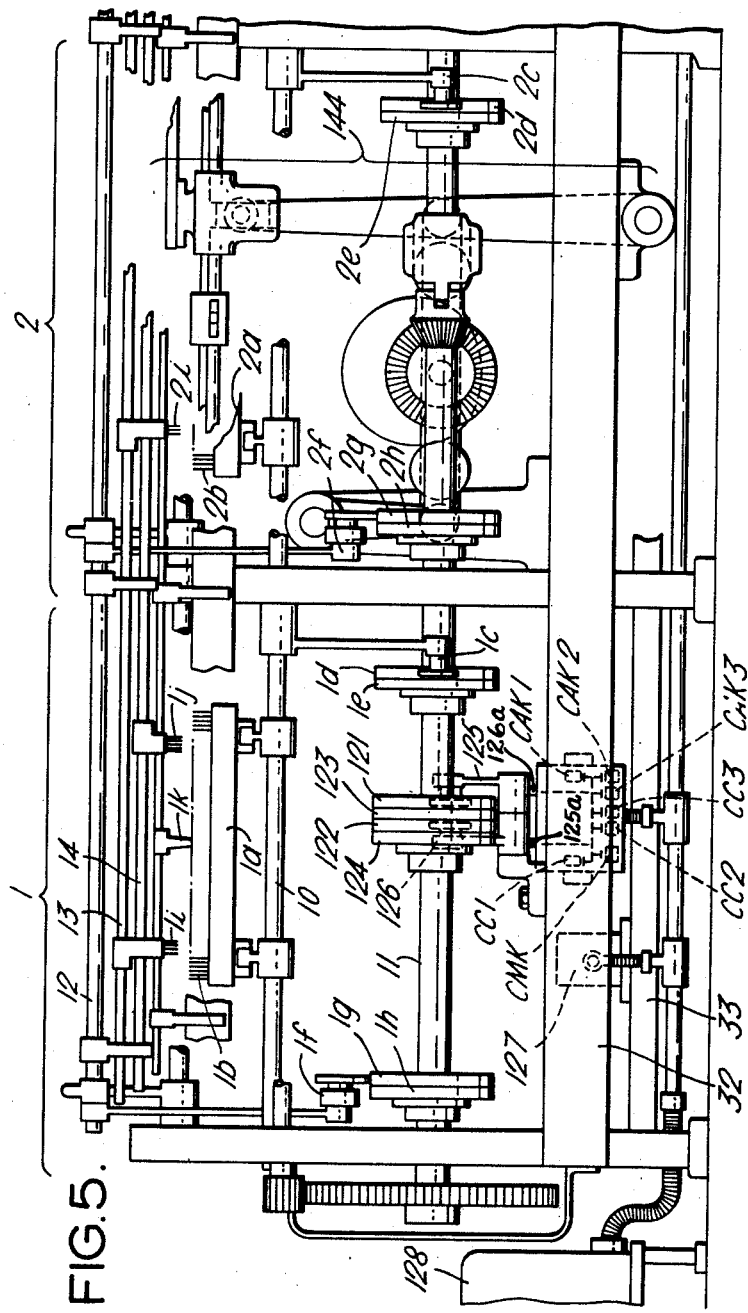

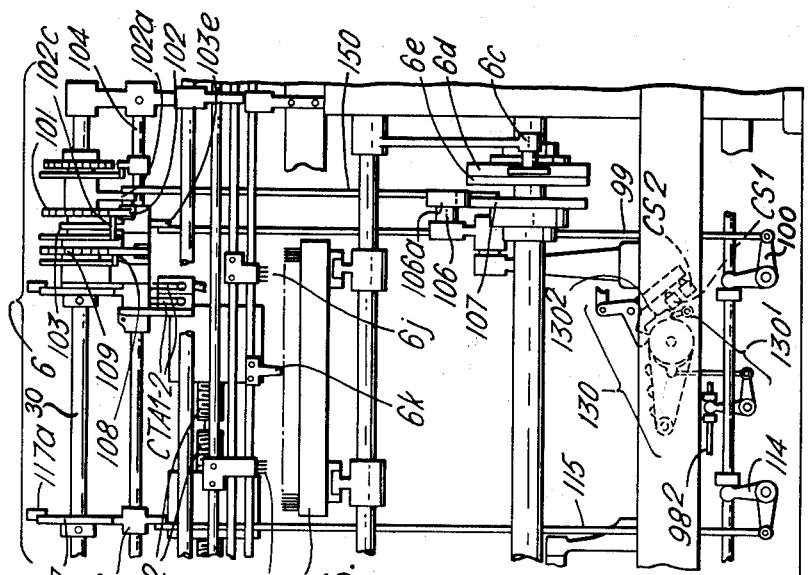
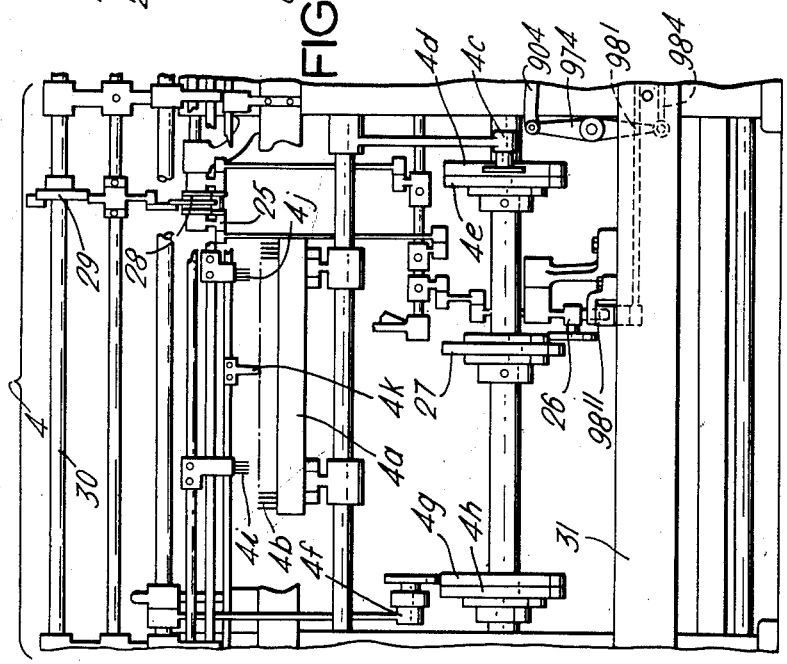

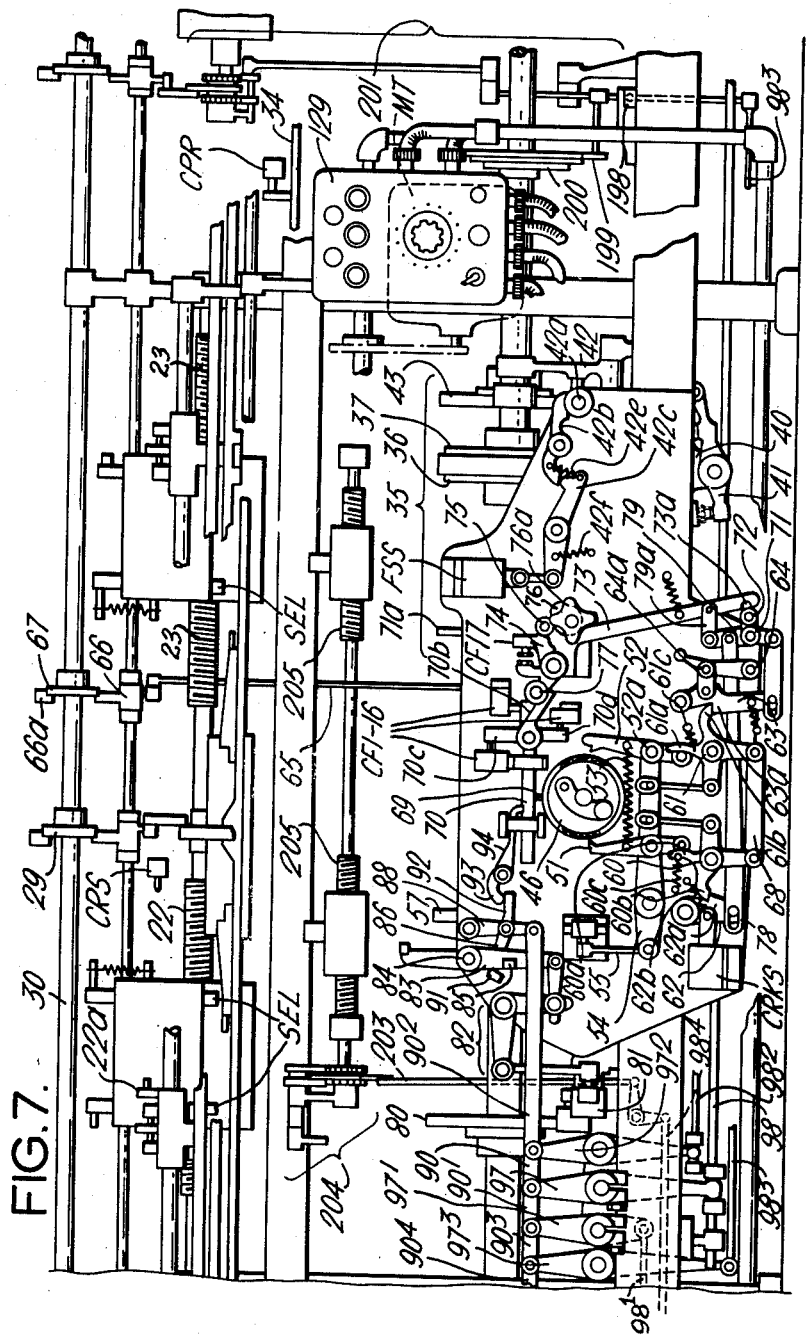

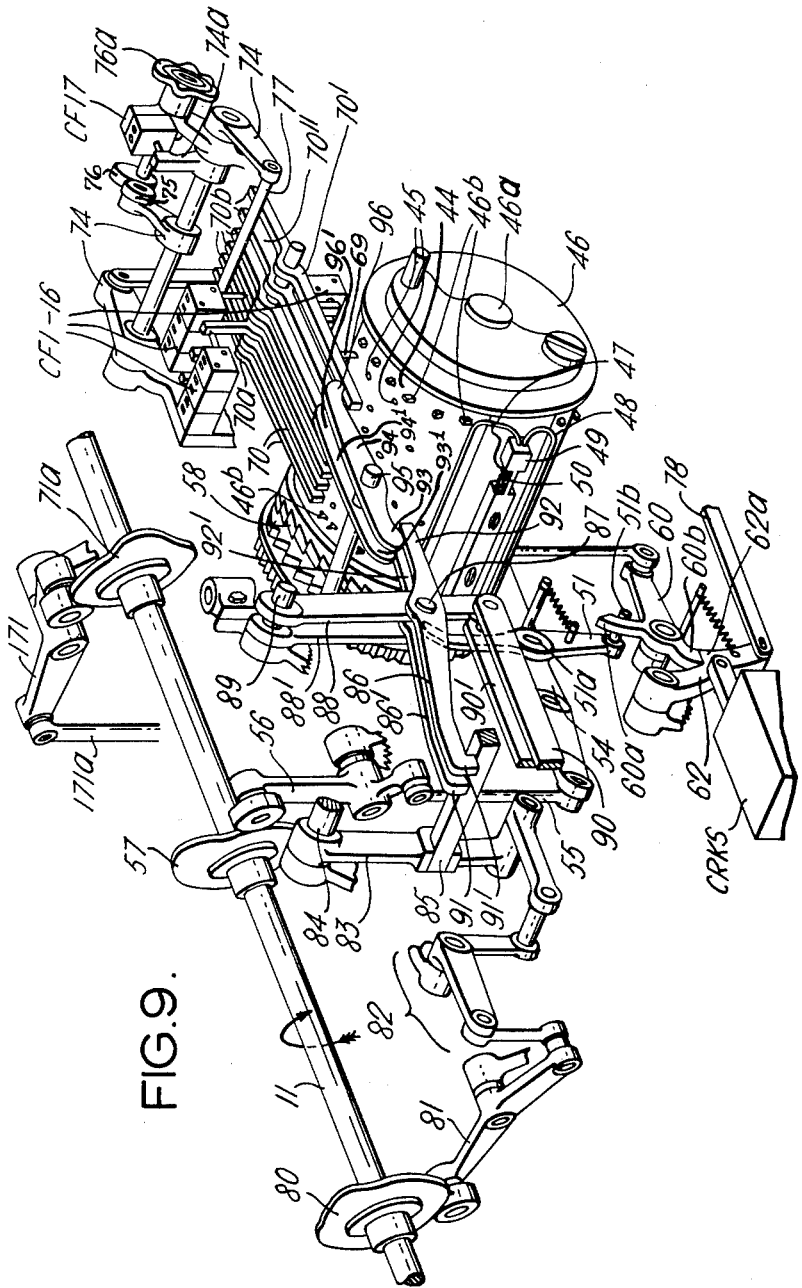

FIG. 13a.

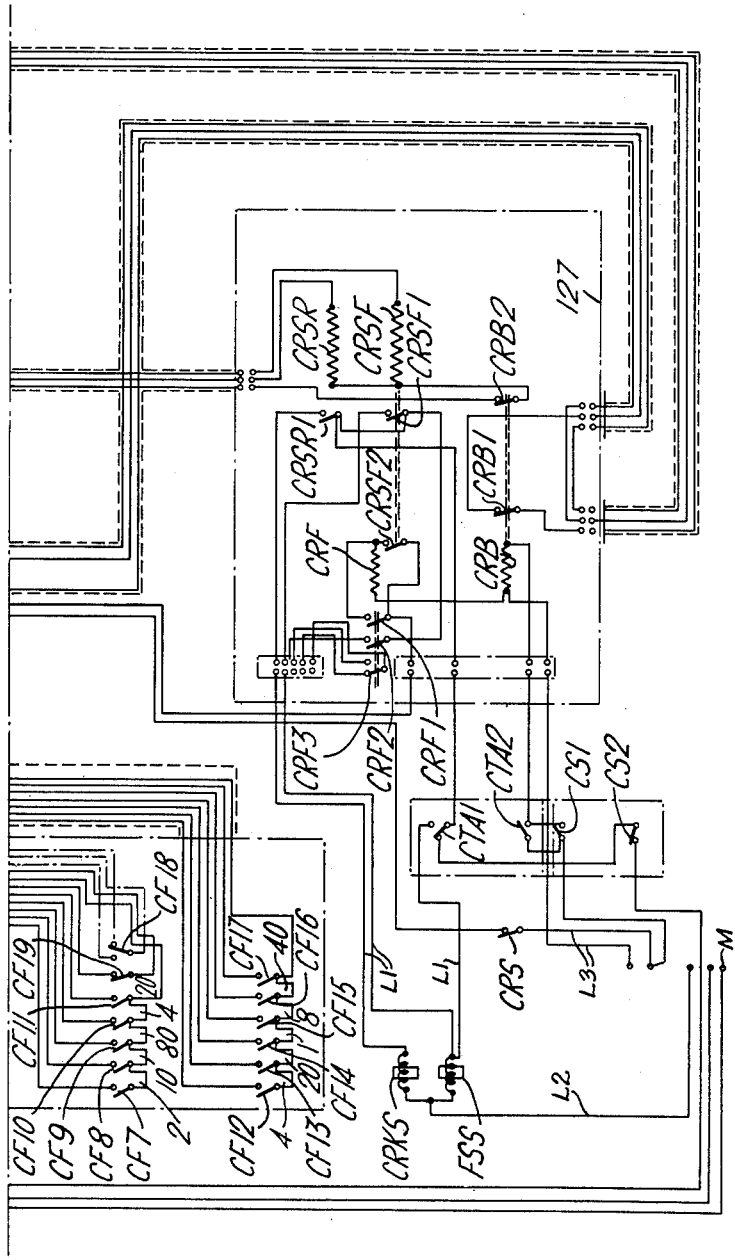

FIG.14. SLACK COURSE

12 RAVEL COURSES

55 PLAIN COURSES

27 NARROWINGS OF 2 NEEDLES AT 5 COURSE INTERVALS

30 PLAIN COURSES

16 WIDENINGS OF 1 NEEDLE AT 8 COURSE INTERVALS

8 WIDENINGS OF 1 NEEDLE AT 5 COURSE INTERVALS

RIB

12 PLAIN COURSES

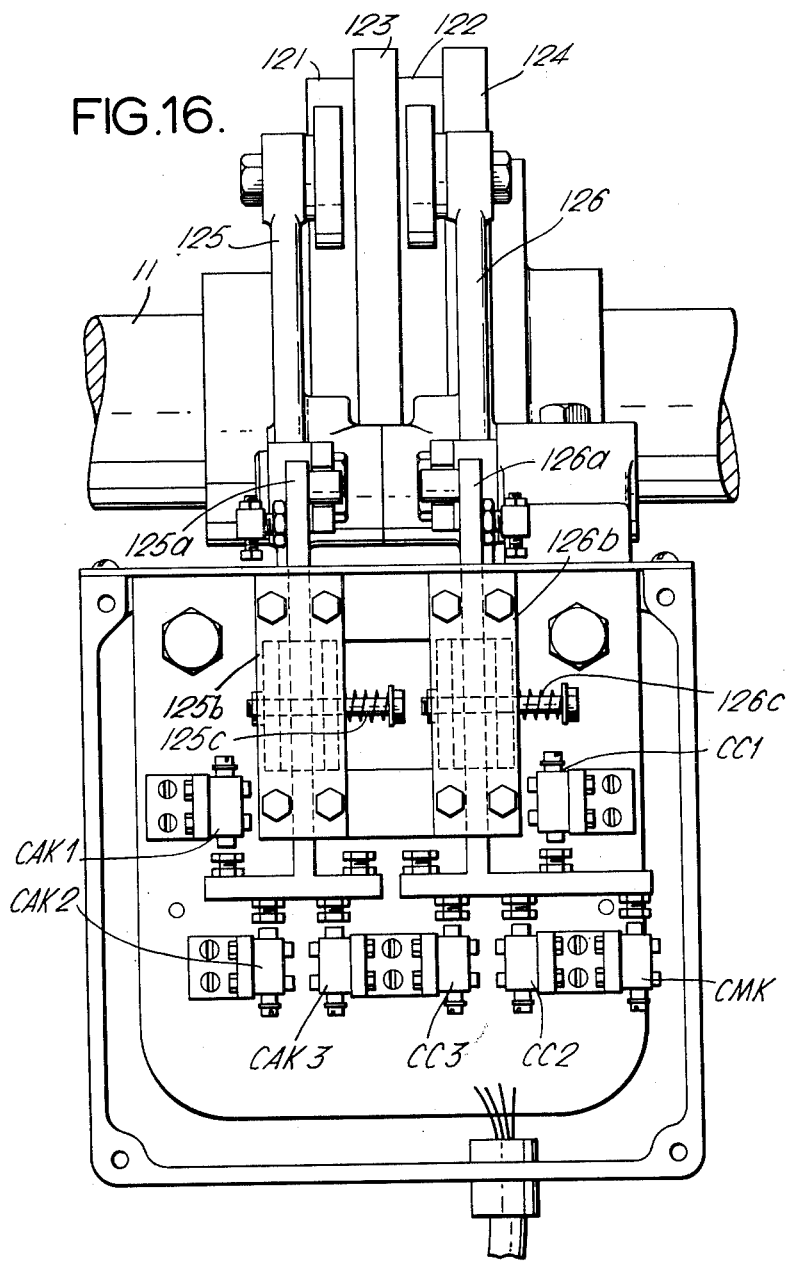

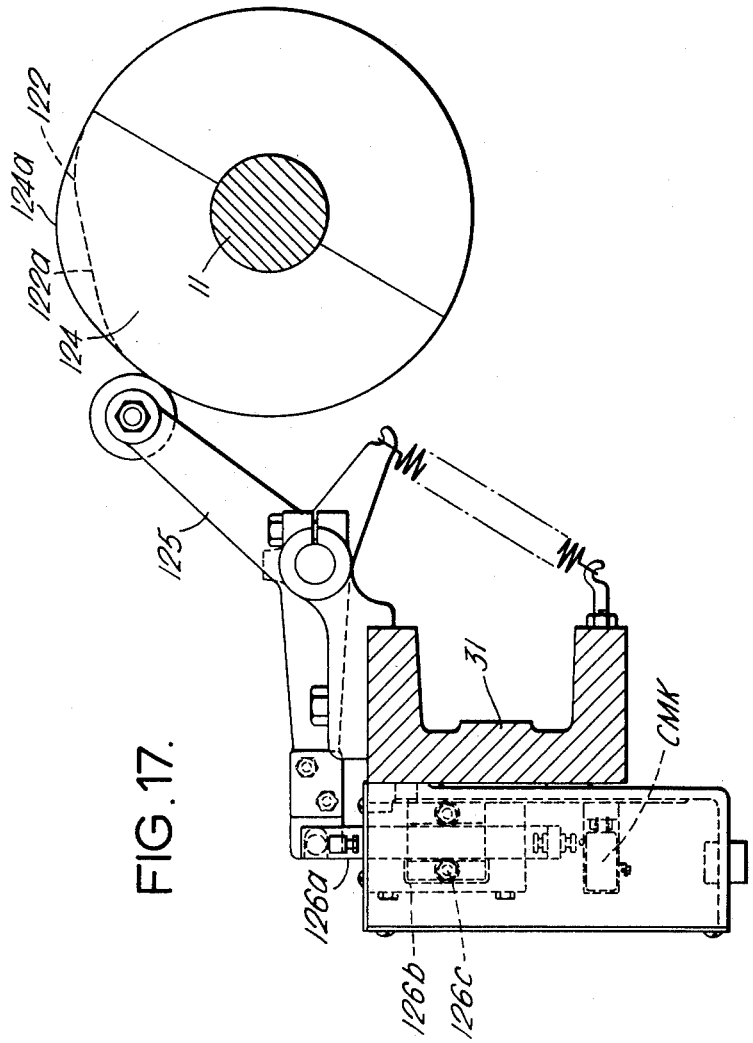

United States Patent Office 3,141,316
Patented July 21, 1964

3,141,316
PATTERN CONTROL MECHANISMS
Patrick Gideon McCarthy and Derrick Edward Hewitt, Loughborough, England, assignors to William Cotton Limited
Filed July 6, 1960, Ser. No. 41,076
Claims priority, application Great Britain July 7, 1959
10 Claims. (Cl. 66—154)

This invention is for improvements in or relating to pattern control mechanism for controlling repeat machine operations primarily in straight bar knitting machines.

In these machines, the usual exceptionally long endless pattern chain, with its plurality of tracks of pattern bits and associated supports and control mechanism, undesirably occupies a lot of space in the machine and in storage, and involves costs and labour time, particularly in setting up the pattern, which it would be an advantage to reduce.

An object of the invention is to provide pattern control mechanism for the aforesaid purpose which is of such improved construction as to at least occupy less space and involve less labour time in setting up the pattern than herebefore.

The invention provides knitting machine programming control means utilizing a programme chart embodying detectable indications representative of knitting machine operations, said operations consisting of at least knitted-course-producing operations and one other knitting machine operation or a selection thereof, a chart-reader adapted for reading the indications and for passing on therefrom operational information, operating means operable for initiating the production of knitted courses and operation of the other knitting machine operations, and control means adapted for receiving said operational information from the chart reader and for giving corresponding operational instructions to the operating means such that knitted articles can be produced on one or more knitting machines under programming control of the programme chart.

The knitting machine may be a straight bar or circular knitting machine having programming control means as above suitable for controlling the production of an article on the machine, and means for repeating operation of the control means for repeat production of identical articles on the machine.

Alternatively the programming control means as above may be suitable for controlling the production of identical articles simultaneously, as for example for controlling courses, fashionings and other operations in a multi-section straight bar knitting machine or for controlling a plurality of knitting machines e.g. in respect of pattern changes in circular hose knitting machines.

Conveniently for controlling courses and one other machine operation electric control means are operable through operation of electric switches by some chart indications and means are operable mechanically from other chart indications for releasably coupling at least one operable mechanism to power operated means, the indications on the chart being in rows and at least three columns, one column for courses, a second column for the other machine operation and a third for the mechanism to be coupled to power operated means.

Conveniently also the indications are set out on the chart consistent with the Binary Coded Decimal System by which the chart can be of relatively small dimensions.

The indications may be holes punched in the chart, the chart reader being adapted to detect the holes. The chart may be a card adapted to be removably mounted about a drum with the rows of indications parallel to the drum's axis and the columns extending circumferentially about the drum, and means are operable to rack the drum forward to present each row in turn to the chart-reader, with means for back-racking the drum after all the rows have been read.

There may be means operable independently of the drum for controlling course production during back racking of the card to avoid waste of production time. Conveniently the chart-reader utilizes a series of pivoted feelers having pegs for entering the holes in the card, with means operable after each detection, and also prior to back racking, for lifting all operated feelers to clear their pegs from the holes to allow forward racking, some feelers each having an associated electric switch operable by its movement, occasioned by its peg entering a hole in the card, to impart said information to the electric control means and other feelers by similar movement operating to mechanically latch desired mechanism to the power operated means.

Conveniently the control means comprises at least a course counter adapted to receive numerical course information from the chart reader and to be thereby set to varying numerical course values, means for operating the counter with a frequency synchronous with the course-producing cycle of the machine, such that during the operation of the counter, the machine produces a number of courses pre-determined by the indication on the chart, means operable by terminal operation of the counter for operating an actuator to initiate operation of the other machine operation, and means operable consequent upon operation of said other operation for operating an actuator to continue operation of the machine. There may be a counter for said other operation, means for operating this second counter with appropriate frequency, re-set means for the course counter, means operable consequent upon each except the last operation of the second counter for operating the re-set means to repeat operation of the course counter, and means operable by terminal operation of the second counter to continue operation of the machine.

The control means may be of electrical type with an electric course counter and a second counter operable by electric switches from the chart-reader, electric re-set generator for the course counter and influenced by the second counter, and a relay panel having relays influenced by the counters for operating the actuators. Conveniently the control means employs information gates, memory circuits, counting decades, a re-set generator and relay panel, all suitably associated in a transistorized electric circuit in the form of an electric controller.

The programming control means may be employed with a straight bar knitting machine for the control of courses and fashionings by the chart-reader reading rows of the indications successively, wherein one column of the indications is for fashionings, said second counter is a fashions counter, electric switches are operable by course and fashion cams respectively for operating the counters and knocking-off the counts, a solenoid is operable through a count of one by the fashions counter to initiate a fashioning, the re-set generator is operable through each fashions count more than one to repeat the course count and so on until the fashions count is complete, and the one fashions count or the last fashions count initiates a reading of the next row of indications in the chart. Conveniently the chart is of racked kind, and a solenoid is operable to rack the card on for a fresh reading, through the last count of the course counter if there is no fashions information present or through said one or last count of the fashion counter.

There may be a manually operable selector for numbers or courses and adapted by its operation to pass on numerical information to the course counter, a manual start switch operable at will of the operator for changing control from the chart to the selector, means operable by terminal operation of the course counter to initiate a fashioning and to repeat the course count and so on, and a stop switch for terminating the operation at will of the operator.

The invention also provides a straight bar knitting machine having a programming arrangement comprising a programming chart embodying rows and columns of detectable indications of numbers of courses and numbers of fashionings, a chart-reader adapted for reading the rows of indications successively and, for passing on information given by the indications, a pair of actuators one for initiating fashionings and the other for initiating the successive readings, control means comprising a course counter, a reset generator therefor, and a fashions counter, all co-related to receive information from the chart-reader according to the instructions of the chart's indications, means associated with the machine's main cam shaft for operating the counters in step with course or fashion-producing revolutions of the main cam shaft, and means operable by terminal operations of the counters to cause operation of said actuators appropriately to automatically carry out required fashionings in a number of courses. Again the chart may be of forward racked kind and is back-racked for repeat operation, the chart includes indications representative of machine operations including racking of a top disc shaft in addition to course and fashioning operations, detection of the latter indications causes coupling of mechanism for said other operations to power operated means so that in the instance of the top disc shaft this is racked on, and on the top disc shaft there is a ravel course counter which is caused by an appropriate rack of the top disc shaft to operate and count for ravel courses during the back-racking of the chart and avoid waste of production time. Said other machine operations consist of such operations as stopping the machine motor, operating a striping chain, cancelling a V neck screw operation, cancelling a main screw operation, racking an auto shaft, and cancelling a racking screw operation.

The invention further provides in or for a knitting machine, a programming control arrangement comprising a manually operable selector for numbers of courses and adapted to pass on numerical information, a course counter adapted to receive said information, means for operating the course counter with a frequency in step with course-producing operations of the machine an actuator operable by terminal operation of the counter to initiate another machine operation, primarily fashioning in a straight bar knitting machine, and automtic re-set means for the course counter thereby enabling any course frequency of operation of said other operation to be produced, the operation being under manual start and stop switch control.

The re-set generator alternatively functions through a relay operated switch or pulses from a machine operated switch.

The manual arrangement includes a manual switch to switch over to automatic control from a machine operated switch.

The above and other features of the invention set out in the appended claims are incorporated in the construction which will now be described as a specific embodiment with reference to the accompanying drawings in which:

FIGURE 1b is a continuation from left to right of FIGURE 1a showing the remaining part of the length of the machine;

FIGURE 4 is a detail view of card drum racking mechanism;

FIGURE 5 is an enlarged view of Nos. 1 and 2 knitting sections;

FIGURE 6 is an enlarged view of No. 4 knitting section;

FIGURE 7 is an enlarged view of a central non-knitting section;

FIGURE 8 is an enlarged view of No. 6 knitting section;

FIGURE 9 is a general perspective view of pattern card control mechanism;

FIGURE 13a is part of a circuit diagram of electrical control means;

FIGURE 13b is a continuation downwardly of FIGURE 13a showing the remaining part of the circuit diagram;

FIGURE 14 is a face view of an outerwear garment blank made according to the pattern set by said card;

FIGURE 16 is an enlarged front view of cam-operated switch means;

FIGURE 17 is a side view of FIGURE 16;

Figure 1A:
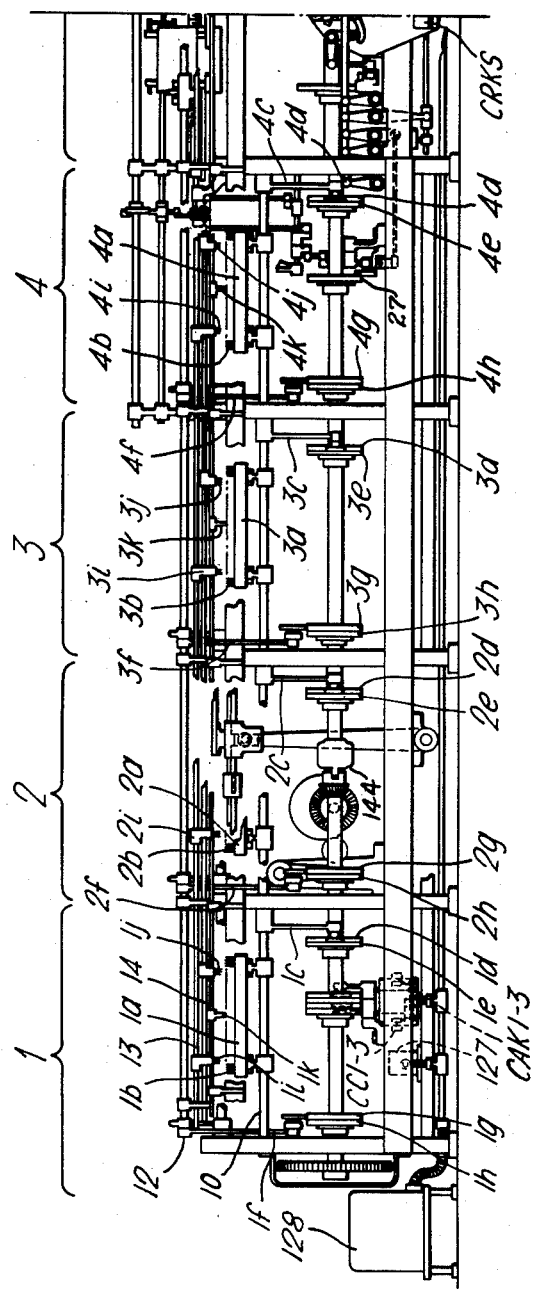
FIGURE 1a is a general front view of part of the length of an eight knitting section Cottons patent straight bar underwear or outerwear machine or pant frame.

Referring now to FIGURES 1a and 1b, the machine shown is of conventional type having ten standards dividing the machine into eight knitting sections 1 to 8 and a central non-knitting or control section 9, each section 1 to 8 having a needle bar 1a to 8a (see FIGURES 5, 6, 7 and 8 for sections 1, 2, 4, 8, 9 enlarged) with needles 1b to 8b, mounted on a shaft 10 to which there is connected a cam follower lever 1c to 8c for operation by a plain knitting cam 1d to 8d and a fashioning cam 1e to 8e, in each knitting section on the main cam shaft 11.

Figure 2:
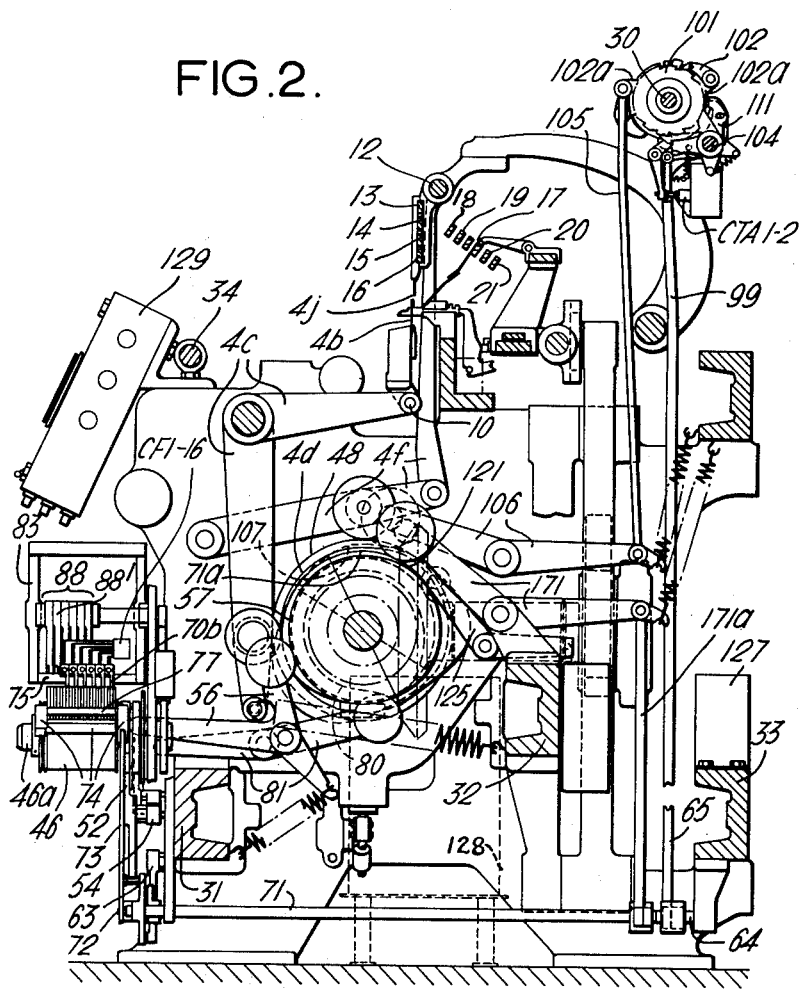
FIGURE 2 is a general cross sectional view of the machine.

Co-operating with the needles there is the usual narrowing head represented by shaft 12 to which there is connected a truck lever 1f to 8f for obtaining no motion by a plain cam 1g to 8g, and fashioning motion by a fashioning cam 1h to 8h on the main cam shaft 11 (driven by motor MT) for obtaining the usual dipping motions of fashioning points such as 1i to 8i and 1j and 3j to 8j on the fashioning bars 13, 14 (and at 15, 16 FIGURE 2). The usual thread carriers are represented at 1k and 3k to 8k on carrier bars represented at 17 (and at 18 to 21 FIGURE 2).

Usual sideways displacements of selvedge stops "SEL" for thread carriers 1k to 8k and transfer points 1i to 8i and 1j to 8j is obtained by usual adjustable screw means represented at 22, 23 (FIGURE 7) with racking means 25 (FIGURE 6) connected to a cam follower lever 26 for operation by a cam 27 on the main cam shaft 11, and bluffing means 28 operated by a disc 29 on the top disc control shaft 30, it being understood that when the machine operates with a fashioning motion this is mainly for shaping (i.e. widening or narrowing by loop transference according to which way the selvedge stops are displaced in the known manner by racking the adjustable screw means 22, 23 either one way or the other by two opposite pawls under control of the bluffing means 28 from the top disc control shaft); but fashioning motions can be for other purposes without shaping as well known in the art.

The usual front rail is shown at 31 and usual back rails at 32, 33 (FIGURE 2).

The usual starting and speed control rod is represented at 34 FIGURE 7.

Figure 3:
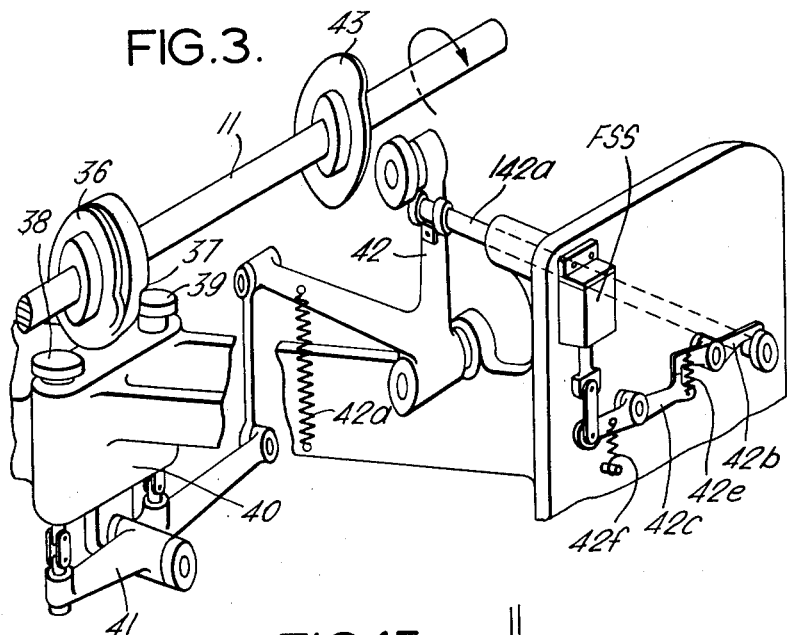
FIGURE 3 is a general perspective view of cam shaft shogging mechanism.

Usual shogging mechanism for the main cam shaft, by which change is made between operation of plain knitting cams and fashioning cams, is indicated generally at 35, and, as shown in FIGURE 3, it consists briefly of a pair of face cams 36, 37 on the main cam shaft 11 rotating between a pair of rollers 38, 39 held relatively stationary by a machine bracket 40. The rollers 38, 39 are connected to parts of a lever 41 on opposite sides of the lever pivot and this lever 41 is connected to a cam follower lever 42 (biassed by spring 42a) and is operable by a cam 43 on the main cam shaft 11. The cam follower lever 42 is normally held clear of its cam 43 by means of a headed rod 142a which is held by a latch 42b and a co-operating latch 42c itself held by a solenoid FSS, against the action of springs 42e and 42f, for plain knitting from the plain knitting cams and when fashioning motion is required, solenoid FSS is operated by means to be hereinafter described such that the cam follower lever 42 is allowed to be operated by cam 43 to take one of the rollers 39 clear of its face cam 37 and to present the other roller 38 in the path of its face cam 36 which consequently effects shogging of the main cam shaft to render the fashioning cams operative for a fashioning motion.

Usual draw mechanism for operation of thread carriers and sinkers is indicated generally at 144 in FIGURE 5.

The usual long pattern chain is dispensed with. This chain usually functions (1) to maintain the shogging cam follower lever 42 clear in any desired sequence of producing plain knitting courses from the plain knitting cams, (2) to free the cam follower lever 42 to be operated by cam 43 for shogging of the main cam shaft for fashioning motions with any desired course frequency and (3) to cause operation of other mechanisms necessary for the completion of production of a blank.

Figure 15:
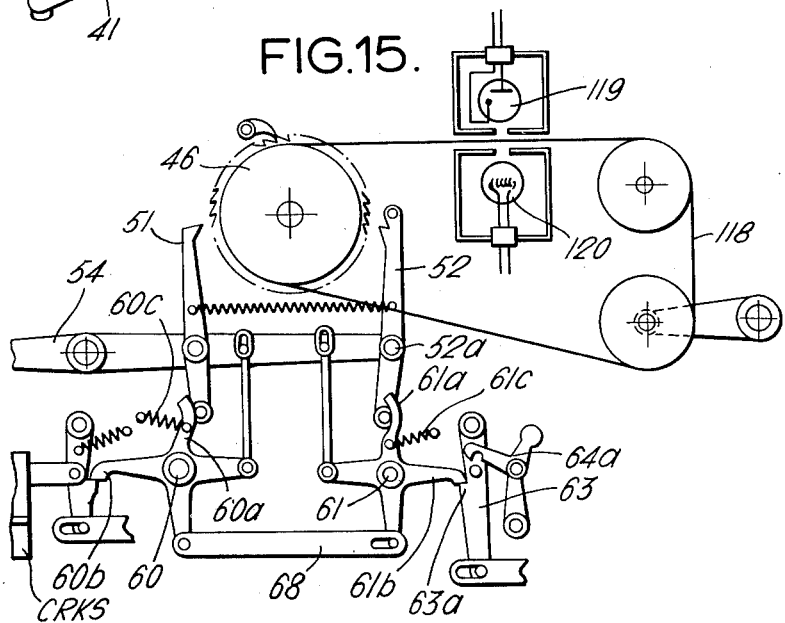
FIGURE 15 is a detail of a modified arrangement using a band instead of a card.

Instead of this usual pattern chain there is employed in this example a punched card indicated at 44 in FIGURE 9. It is to be understood that a program carrier other than a card may be employed, such for example as a band 118, FIGURE 15, but for the sake of convenience the particular description will make reference only to a card. The card 44 has holes 45 in a predetermined code sequence to suit the pattern required of a blank to be produced, and this will be more fully described hereinafter.

For supporting the card 44 there is a drum 46 mounted by an axle 46a at the front of the machine in the central control division 9, see also FIGURE 7.

Figure 12:
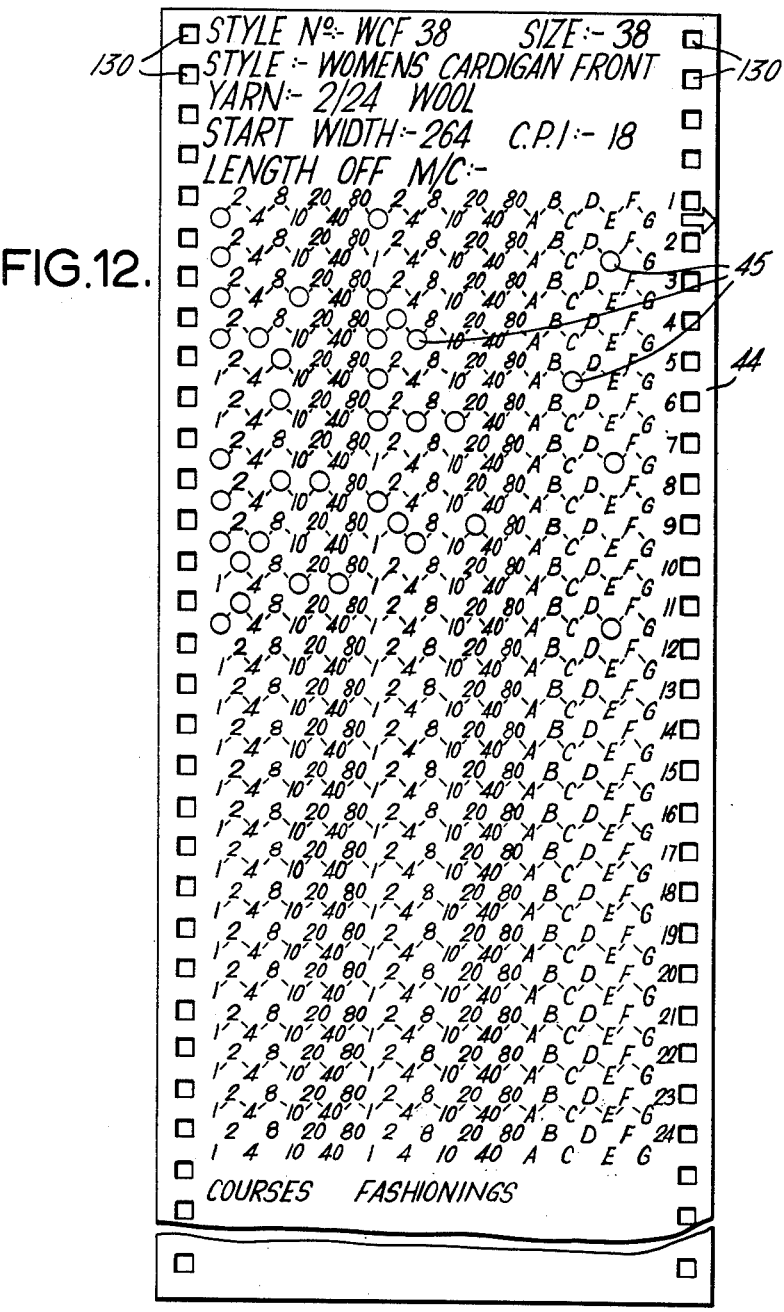
FIGURE 12 is a detail face view of a pattern card with punched holes for one pattern.

A typical card is illustrated in FIGURE 12 from which it will be seen that the card has teeth-receiving holes 130 at each side by which it is fitted to the drum 46 on the teeth of suitable toothed formations 46b, at each end of the drum 46. The card is marked with numbers and letters in alternate rows of 2, 8, 20, 80, 2, 8, 20, 80, B.D.F. and 1, 4, 10, 40, 1, 4, 10, 40 A.C.E.G. the first two alternate rows or all the rows being so marked in columns.

This arrangement is of staggered form such that successive pairs of rows are used together for each selection required. Therefore each selection is made in respect of a set of numbers 1, 2, 4, 8, 10, 20, 40, 80, on the left of the card for courses, and a similar set in the middle of the card for fashioning motions for shaping and for fashioning motions for purposes other than shaping, the numbers being in accordance with the Binary coded decimal system, and letters A to G on the right of the card for other operations such for example as labelled "motor stop," "stripping chain," "V-neck screw cancel," "top disc rack," "racking screw cancel," "extra courses manual control," and hereinafter more fully referred to.

By this arrangement, the holes in successive pairs of rows, in this particular example of FIGURE 12, represent machine operations in the following sequence for producing a garment blank illustrated as an example in FIGURE 14.

1st pair of rows—1 course—1 fashioning motion (during which a rib is transferred from points to the machine needles.)
2nd pair of rows—1 course—(rack of top disc shaft, by mechanical removal of bluff from one rack pawl to set selvedge stops for 1 needle widening).
3rd pair of rows—11 courses—1 fashioning motion for shaping (by said widening).
4th pair of rows—5 courses—7 fashioning motions for shaping (by said widening).
5th pair of rows—8 courses—1 fashioning motion for shaping (by said widening). 1 mechanical operation to introduce draw off weight by mechanical release of a latch.
6th pair of rows—8 courses—15 fashioning motions for shaping (by said widening).
7th pair of rows—1 course—1 mechanical operation (rack of top disc shaft, by mechanical removal of bluff from the other rack pawl, to set selvedge stops for two needle narrowings).
8th pair of rows—29 courses—1 fashioning (by said narrowing) motion for shaping.
9th pair of rows—5 courses—26 fashioning (by said narrowing) motions for shaping.
10th pair of rows—52 courses.
11th pair of rows—3 courses—3 mechanical operations (rack of top disc shaft for spare racks and to initiate slack course).

The card is releasably mounted on the drum, for interchange with other similar cards having differently arranged code holes for other patterns, by a pair of wire loop clips 47, 48 pivotally carried by a bar 49 secured to the drum 46 and biassed by spring means 50 towards clipping the ends of the card 44 on the drum.

The drum is intermittently racked round to present different code rows of holes to an upper detecting station, and, after all the rows of holes have been detected, is in this example, back racked for repeat operation by racking means, as follows, FIGURES 4, 7, and 9.

There are provided forward and back racking pawls 51, 52 (see particularly FIGURE 4) which are connected by a spring 53 and are pivoted at 51a, 52a to a lever 54 which is pivoted at 54a and is connected by a link 55 to a cam follower lever 56 operable by a cam 57 on the main cam shaft 11. With the drum in non-rack position as shown, both pawls 51, 52 are held clear of respective rack wheels 58, 59 on the drum 46, by one arm 60a, 61a of bluff levers 60, 61 engaging (against a spring 60c, 61c) pegs 51b, 52b on the pawls 51, 52.

The bluff levers 60, 61 are held in this position by second arms 60b, 61b of them resting on shoulders 62a, 63a of pivoted latches 62, 63.

Latch 62 is released from its position (against spring 62b) by energising a card rack solenoid CRKS which is operated, to allow pawl 51 to rack the drum 46, by means hereinafter described. Latch 63 is released from its position (against a spring 63b) through a hand releasable catch connection 64a with a shaft 64 which it partly rotated through a link 65 (FIGURE 7) and a connected cam follower lever 66 and a pattern disc 67 on the top disc control shaft 30 (operation of the latter being more fully described hereinafter).

Hand release of catch 64a (FIGURE 4) prevents back racking from taking place if and when desired for any reason.

A link connection 68 between the bluff levers 60, 61 ensures that when one pawl is operative the other pawl must be inoperative.

Means for detecting the code holes 45 consist in this example of pegs such as shown at 69 in FIGURES 7 and 9 on the underside of feeler arms 70, of which there are conveniently twenty three as indicated in FIGURE 2, and which are pivoted at 70a. It is to be understood that detector means other than the pegs on feeler arms may be employed, such for example as represented by the light sensitive cell 119 and light source 120, FIGURE 15. For raising the feelers 70 to clear the pegs 69 from the card when required to rack the card drum 46, there is a rocking shaft 71, FIGURE 4, which rocks to and fro from a cam 71a, FIGURE 7, through suitable linkage 171a and cam follower lever 171 (FIGURES 2 and 9) once for each revolution of the main cam shaft 11; oscillated by this shaft 71 there is an arm 72 connected to it and having a peg 72a which, when the feelers 70 are down does not engage a recess 73a in a link 73, which latter is pivoted at its upper end to a roller frame lever 74 FIGURES 7, 9, having a roller 75 engaged by a hand turnable cam 76, the other end of the lever 74 having a rod 77 overlying tail portions 70b of the feelers 70. The link 73 is held clear of the peg 72a by the card rack solenoid CRKS acting through a link 78 connected to an arm 79 (FIGURES 4, 7) and a link 79a connecting the arm 79 to the link 73. Consequently when the card rack solenoid CRKS is energised to initiate racking of the card drum 46 "On," it pulls the link 73 towards the peg 72a which engages in the recess 73a and by the motion of shaft 71 raises link 73 to raise the feeler pegs 69 out of the card 44, the action being reversed to engage the pegs 69 with the next row of code holes 45 and so on until all the rows have been detected whereupon the drum 46 is back racked under control of said pattern disc 67.

The hand turnable cam 76 is manually turnable by the hand wheel 76a to raise the feeler pegs 69 clear of the drum at any required time such as when mounting a card on the drum.

The operation of the feeler pegs 69, selectively lowering into the differently set-out rows of holes on the card, is to operate electric switches in the same selective arrangement as that of the holes for controlling the course and fashioning motion frequency by the switches pre-setting course and fashioning counting means which are caused to count and control courses and fashioning motions by control of said card rack solenoid CRKS and said fashion solenoid FSS.

For convenience, the switches, numbers CF1 to CF16 FIGURES 7, 9 (see also FIGURE 20) are divided into three banks each operated by one of three arms 70b, 70c and 70d (FIGURE 7) of feelers 70.

In addition there is a master or "0" volts return switch CF17 (see also FIGURE 20) operable immediately after each selection through the feelers 70 and said rod 77, lever 74 and an arm 74a connected to said lever 74, so that information through the selection of switches is received by the counting means together.

The machine further incorporates a group of electric switches, FIGURES 1a, 5, 13a, 16 and 20 comprising instruction knock-off switches CAK1, CAK2, CAK3, count signal switches CC1, CC2, CC3 and a further instruction knock-off switch CMK which are operated at required times by plain knitting cams 121, 122 and fashioning cams 123, 124 through the intermediary of cam follower levers 125, 126 respectively for a purpose to be hereinafter described.

As shown in FIGURES 5, 16, the cam follower levers 125, 126 operate the switches through the intermediary of slide bars 125a, 126a (FIGURE 16) mounted in slideway boxes 125b, 126b and spring means 125c, 126c ensuring sufficient friction between the parts to avoid undesired operation of the switches. Each course cam 121, 122 has a fall such as shown at 122a in FIGURE 17 to operate the switches CAK1, CC1 and each fashioning cam 123, 124 has a rise such as shown at 124a to operate switches CAK2, CAK3, CC3, CC2 and CMK.

Additional fashion solenoid operating switch CTA1 and count break switch CTA2, FIGURE 8, are provided operated by means associated with the ravel counter mechanism as also to be hereinafter described.

All the electric switches, solenoids, and relays in a relay box 127, FIGURE 1a, 2 5 and 20, are connected in a suitable electric circuit, to be fully described, and which in turn is connected to a suitable electric controller 128 FIGURE 5 to be described, and to a suitable control panel 129, FIGURE 7, in the central control section 9.

Figure 13A:
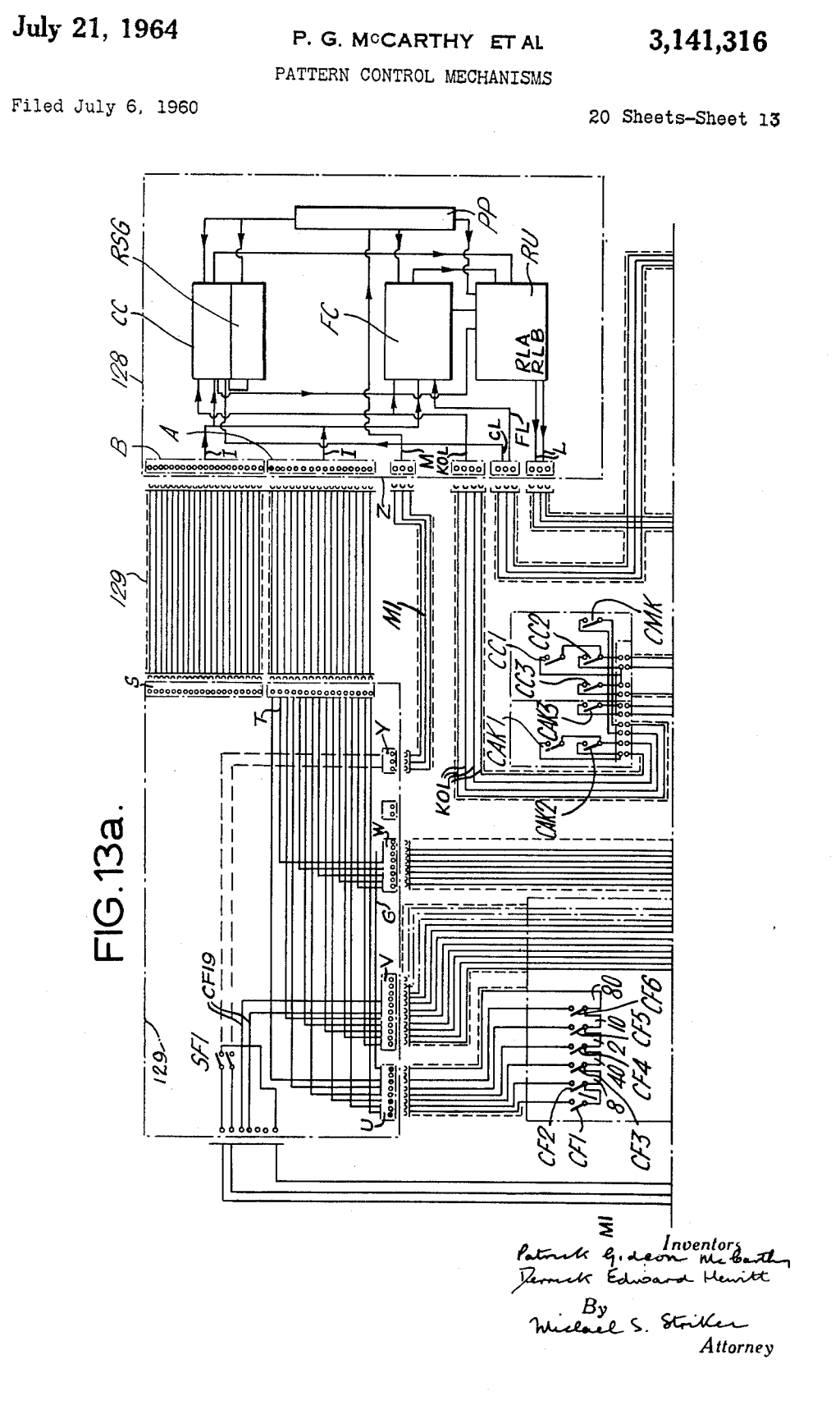
Figure 20:
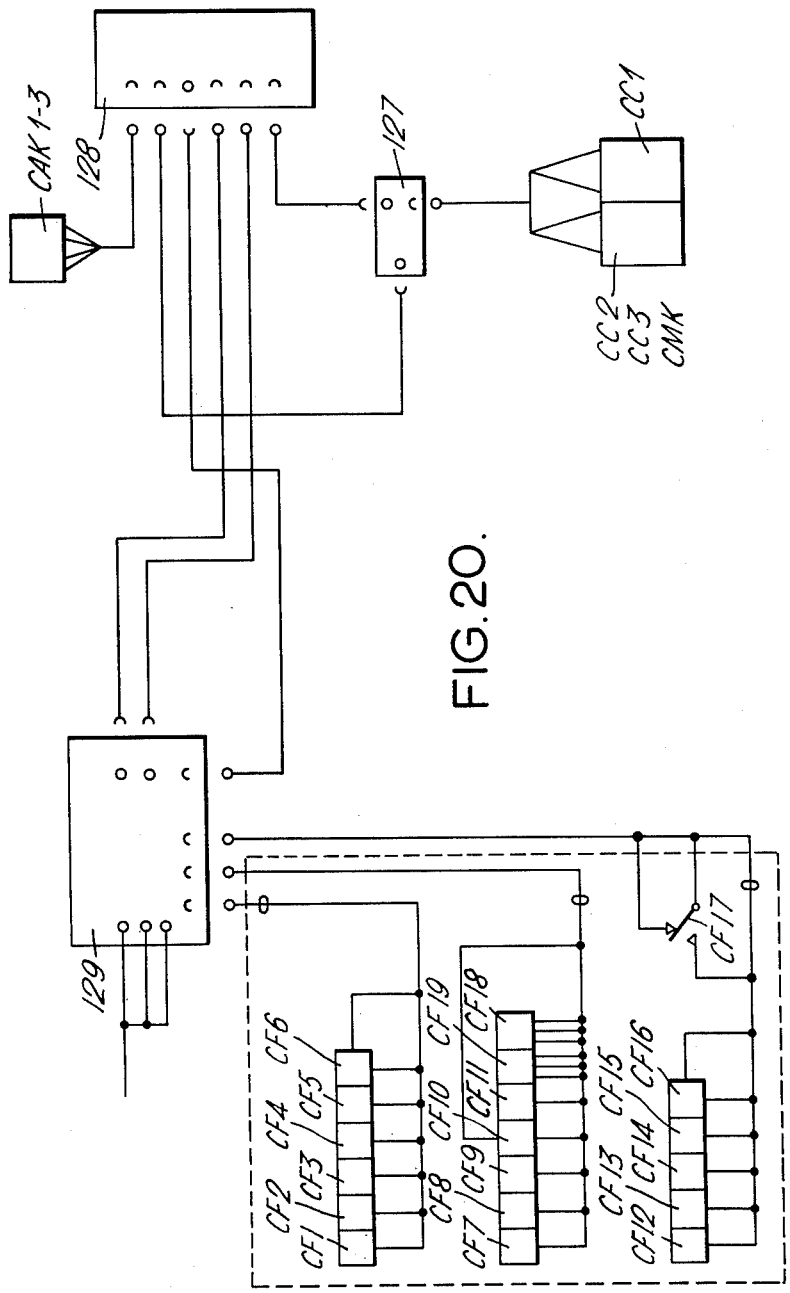
FIGURE 20 is a block diagram of the electric control arrangement.

The electric circuit including said switches, solenoids and relays, all for connecting to said controller 128, is shown in FIGURES 13a and 13b, the block diagram, FIGURE 20, being for general reference only.

Power is fed to the circuit from mains indicated at "M" (FIGURE 13b) through mains lines indicated at M1 and terminal board MTB to mains switches SF1 (on control panel 129 see also FIGURE 19), the mains switches SF1 being connected through a plug and socket Y (on control panel 129) and through plug and socket Z to the controller 128 which mounts the latter. One side of the switches CF1–CF16 and of the "0" volts switches CF17 is connected to plug and sockets U, V, W, the latter are connected to plugs and sockets S and T, and from these, lines lead to plugs and sockets A and B on the controller 128. From the plugs and sockets A, B, input lines represented at "I" (and more completely shown in FIGURE 19) lead into the controller 128 as hereinafter described with reference to FIGURE 19. The "0" volts switch CF17 is also connected through lines F, F1, FIGURE 19, to a tag panel TP from which line G connects commonly to the plugs and sockets U.V.W, the arrangement being consequently such that closure of the "0" volts switch CF17 renders any of the switches CF1–CF16, when closed, simultaneously effective to pass instruction to the controller. The controller 128 contains, briefly, units and tens courses and fashions counters (the latter for fashioning motions with or without shaping) represented at "CC" and "FC" with an associated re-set generator represented at RSG, a relay unit at "RU," and a power pack at "PP" (all to be more fully referred to hereinafter with reference to the controller 128 from which it will be seen that the switches CF1 to CF16 function to supply information from the holes in the card to the controller).

The switches CC1, CC2 and CC3 are signal switches for sending counting pulses to the controller and are operable by said cams 122 and 124 and are connected in the circuit through lines CL, FL to the controller 128 (see also description of controller through relay box 127. In the latter there is a card rack slave relay CRSR with switch CRSR 1 a fashioning slave relay CRSF with switches CRSF1, and CRSF 2, a fashion retaining relay CRF with switches CRF1, CRF2, CRF3, and a count break relay CRB with switches CRB1 and CRB2, these parts being appropriately connected by lines "L" to the controller (see also description of controller) and through lines L1 to the card rack solenoid CRKS and the fashion or main cam shaft shogging solenoid FSS which are connected by line L2 to the mains "M."

Card rack slave relay CRSR and fashion slave relay CRSF are energised through the lines "L" from the controller to supply, through their switches CRSF1, CRSR1, energy to the card rack solenoid CRKS and the fashioning solenoid FSS.

The retaining relay CRF is energised, from the controller mains "M" through lines L3, upon operation of the fashion relay CRSF, through a switch CRSF2 to retain the fashion solenoid FSS through switch CRF2, the fashion retaining relay CRF having a self-retaining contact through switch CRF1; switch CRF3 operates to control motor speed. The instruction knock-off switches are connected to the controller 128 by lines KOL (see also description of controller).

In operation of this circuit, the controller 128 is of a type wherein the counters "CC" and "FC" are capable of receiving count information for courses and count information for fashioning motions (for setting the counters), of also receiving count and count break signals for courses and fashioning motion (for operating the counters) and for giving appropriate instructions according to count information. Count information is passed to the controller from the switches CF1 to CF17 as selected by each row of holes on the card.

The signal switches CC1, CC2, CC3 give the count signals to the controller from the course and fashioning cams 122, 124 and the instruction knock-off switches CAK1, CAK2, CAK3, CMK, give the instruction knock-off signals to the controller from the course and fashioning cams 121, 123, 124; closing of these switches being normally ineffective until rendered effective by the controller.

Instructions from the controller are variable according to the count information passed to its counters "CC" and "FC" from the holes in the card. In the instance of course count information only, from one or more course holes the controller allows the production of the desired number of courses until the count is complete whereupon the controller by its consequent instruction causes energising of the card rack relay CRSR which closes switch CRSR1 to complete the circuit to the card rack solenoid CRKS whereby the card is racked on for the next selection; the card rack relay CRSR is de-energised by instruction knock-off switch CAK1 as operated by cam 121 and as rendered effective by the controller.

The cycle of events is as follows:

(1) Feelers down to read card;
(2) Information to controller;
(3) Count operation (for one or more courses);
(4) One or last count energises card rack solenoid;
(5) Lift feelers;
(6) Card rack;
(7) Knock-off instructions during card rack;
(8) Feelers down for next reading.

In the instance of fashioning count information only, from one or more fashion holes, the controller, by its consequent instruction causes energising of the fashioning relay CRSF which closes switch CRSF1 to complete circuit to the fashion solenoid FSS (and closes switch CRSF2 to operate retaining relay CRF thereby to close switches CRF1, CRF2, CRF3, which in this instance is not effective for retaining); the controller allows the required number of fashioning motions to thus take place until the count is complete whereupon the controller by its consequent instruction causes switches CAK2, and CAK3 to be effective when next closed by cam 123 to de-energise the fashion relay CRFS, the fashion retaining relay CRF, and solenoid FRS, and further causes energising of the card rack relay CRSR to rack the card on by solenoid CRKS as before.

The cycle of events is as follows:

(1) Feelers down to read card;
(2) Fashion solenoid energised;
(3) Fashioning motions;
(4) Count fashion;
(5) Knock-off course instruction not effective;
(6) Count last fashion;
(7) Energise card rack solenoid;
(8) Lift feelers;
(9) Card rack;
(10) Knock off courses and retaining instruction;
(11) Feelers down.

In the instance of combined course count and fashioning information from one or more course holes and one or more fashioning holes, the controller allows the production of the desired number of courses until the count is complete as before, but then, by its fashioning instruction, it causes energising of the fashioning relay CRSF and of the retaining relay CRF as before for a fashioning motion.

The retaining of the fashions solenoid by the retaining relay CRF is necessary in this instance of combined course and fashions information, to avoid the fashion instruction being cancelled by operation of the instruction knock-off switch CAK1 during the last course before the fashioning motion so that the fashions solenoid is held operated until de-energised by operation of the fashions retaining knock-off switch CAK3 in the fashions cycle.

If there is only a count of one for one required fashioning motion the completion of the count causes energising of the card rack solenoid CRKS, for racking of the card for the next selection; but if there is a higher count for a higher number of fashioning motions the completion of the first fashioning count re-routes, through the re-set generator, back to the course counter which repeats the original course count and so on until the fashioning count is complete whereupon the controller by its instruction causes energising of the card rack relay CRSR to rack the card on by solenoid CRKS as before, fashions relays CRSF and CRF having been de-energised by KO switches CAK1 and CAK3.

The cycle of events is as follows:

(1) Feelers down to read card;
(2) Count information courses and fashioning motions to controller;
(3) Count operation (for one or more courses);
(4) One or last count energises fashion solenoid;
(5) Knock-off count instructions;
(6) Fashioning motion;
(7) Count one fashioning motion (re-set course count if appropriate);
(8) Fashion retaining;
(9) Count one or more courses 3;
(10) Repeat 4, 5, 6;
(11) Last fashion count energises card rack solenoid;
(12) Lift feelers;
(13) Card rack;
(14) Knock-off count already done (5) Knock off fashions retaining (8) effective;
(15) Feelers down for next reading.

Switches incidental to the main operation but operated from the card are, a switch CF18 connected to the manual control and operated from the card by a hole and one of said feelers 70 to instigate control from the manual control panel 129 of a number of courses to which the manual control is set, without a fashioning motion; a motor stop switch CF19 operated by a hole in the card and a feeler 70 to stop the motor MT and consequently stop the machine for any desired purpose.

Various other switches incidental to the main operation and not operated from the card are; said switch CTA1 which is operable by ravel counter-mechanism (to be described) to close circuit to the fashions solenoid in instances of producing marks in the fabric; said switch CTA2 which is operable by the ravel count mechanism to energise count break relay CRB which operates switches CRB1, CRB2 to break the course and fashions count line and the common line to the slave relays and thereby avoid undesirable operation of the counters and of the slave relays during the ravel counting when the card is being back racked; switches CS1, CS2 which are operable by suitable means such as generally indicated at 130 to similarly avoid operation of the counters and solenoids when desired in known striping; switch CRS which is operable by suitable means such as part 22a of selvedge mechanism when fashioning motions are utilized for fashioning the fabric and the fashioning fingers have racked in to maximum extent to break circuit to the fashions retaining relay and thereby prevent further racking-in of the fashioning fingers.

Figure 18:
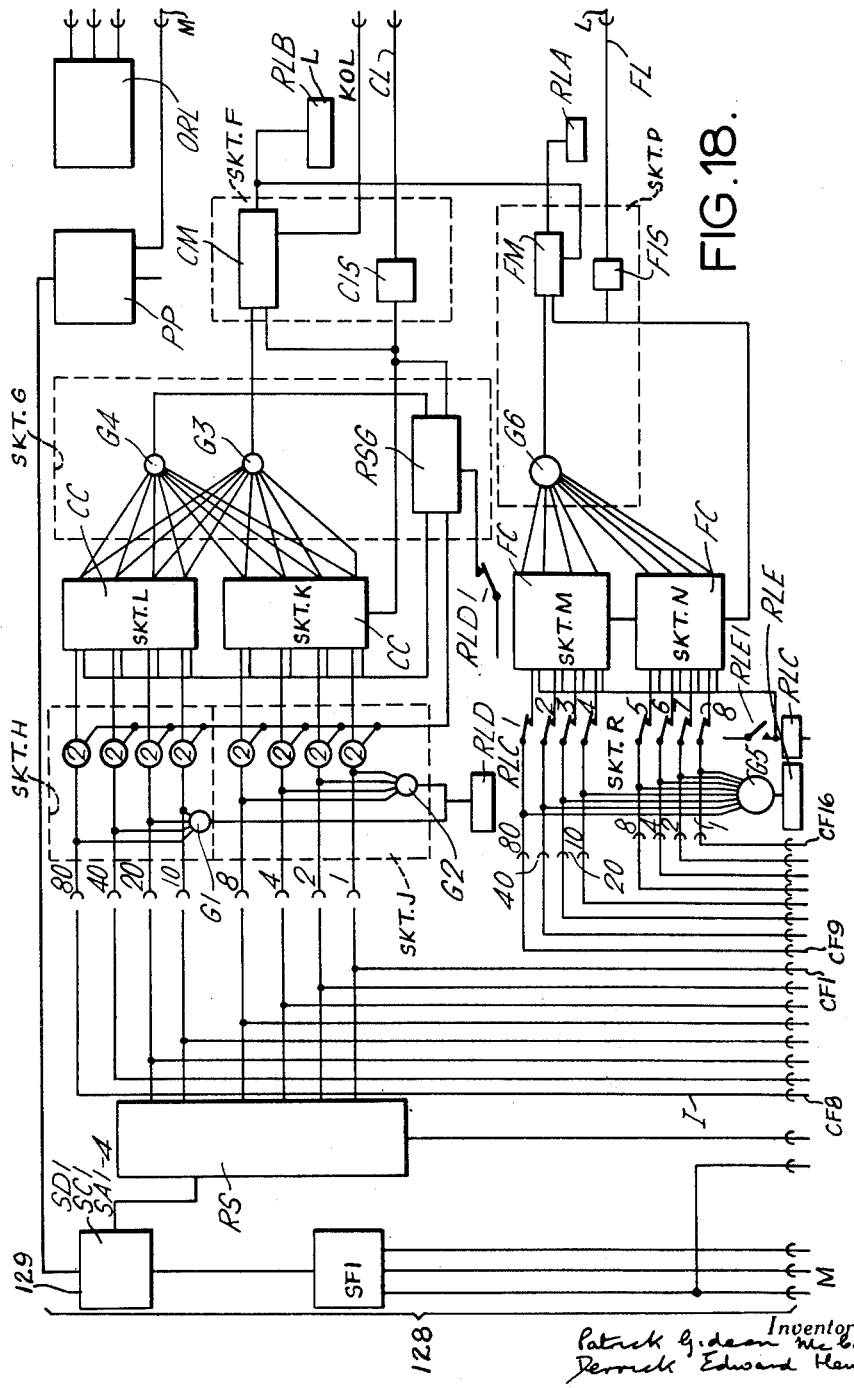
FIGURE 18 is a block diagram of an electric controller.

The controller 128, FIGURE 18, is contained in a dust sealed case. All electronic circuits, except large components which are not capable of being mounted on a printed circuit, are carried on ten printed boards (as hereinafter listed). These boards are in the form of plug-in units carried in a slotted framework mounted inside the case. The power pack "pp" is also a plug-in unit carried in the same slotted framework. All relays of relay unit "RU," of which there are shown relays "RLE," "RLC," "RLD," "RLB," and "RLA," are the Ericsson common yoke type ten, and are carried on a U bracket which is mounted also in the slotted framework as a plug-in unit (SKT.R, see list). All plugs and sockets used are "Plessey" mark 4 miniature screw-in types. In the controller circuit two binary coded decimal decades "CC" (SKT.L, SKT, K, see list) are arranged in series to form the units and tens courses counter "CC" and two binary coded decimal decades "FC" (SKT.M, SKT.N, see list) are arranged in series to form the unit and tens fashions counter "FC."

Inputs "I" from the chart reader through the switches CF1–CF8 to the "courses" binary coded decimal decades "CC" are taken through two input gates "G1," "G2," each with four input circuits contained on two printed boards (SKT.J, SKT.H, see list). The two "courses" binary coded decimal decades "CC" are each connected for output to two gates G3, G4 of which gate G3 is a "one" gate and gate G4 is a "zero" gate. These gates are diode gates contained on a printed board. Connected to the "one" gate G3 is a "courses" memory CM located on a separate printed board (SKT,F see list) and consisting basically of a binary switch.

The "courses" memory "CM" is operatively connected to relay RLB, suitable for operating it.

A course input shaper CIS is operatively connected between a "courses" input pulse line "CL" from the machine operated course signal switches CC1, CC2, CC3 and the courses binary coded decimal decades "CC" suitable for counting on the binary coded decimal decades input "I" from the chart reader through switches CF9–CF16 to the fashions binary coded decimal decades FC are gated by gate G5 (SKT.R) on the input by contacts RLC1 to 8 of relay RLC, and they have output to a "one" gate G6 (SKT.P). A fashions memory FM (SKT.P,) is basically a binary switch, substantially the same as the courses memory CM, and it is connected, for input to the "one" gate G6.

The fashions memory FM is operatively connected to relay RLA suitable for operating it. A fashions input shaper FIS is operatively connected between a fashions input pulse line "FL" from the machine operated fashions signal switches and the fashions binary coded decimal decades FC suitable for counting on the fashion decades FC.

The re-set generator RSG consists of transistor circuits mounted on a circuit board (SKT.G,); its input is derived alternatively from the chart reader through relay RLD and normally made relay switch RLD1 or from a "courses" line "CL" from the machine operated course signal switches; its output is connected to the gating of the "courses" binary coded decimal decades "C."

In operation of the controller for "courses" only and instruction with the card feelers 70 raised, no feeler switches CF1 to 19 are made; therefore the input lines "I" of the "course" counter "CC" are all open circuit, which means that the four input circuits of each of the input gate boards G1, G2 are inoperative so that relay RLD is unoperated. This condition holds the reset generator in such a state, due to the relay contact RLD1 being closed, that the "courses" binary coded decimal decades "CC" are held at zero count. When the card feelers 70 are dropped, any which register with a hole causes closing of the associated feeler switch, and therefore the associated input line is returned to 0 volts. This being so, the gates G1, G2 energise relay RLD causing it to open switch RLD1 and to set the "courses" binary coded decimal decades "C" to the state selected by the card. This state is maintained until relay RLD is operated to close switch RLD1 at a later stage which then removes the permanent set state to zero leaving the courses binary coded decimal decades "CC" set to zero. The courses binary coded decimal decades are arranged so that on receipt of each pulse from the machine through line "CL" the stored state is reduced by one, i.e. the courses binary coded decimal decades count back to zero. Each courses pulse energises the courses input shaper CIS which transforms the input to a form suitable for counting on the courses binary coded decimal decades CC.

When the courses decades "CC" count back to the state of one, i.e. one before the end of the instruction, the "one" gate G3 is energised. The output of this gate G3 is taken to the courses memory CM such that the next pulse, i.e. the zero pulse, can pass into the courses memory CM. Whenever the "one" gate G3 is unenergised the courses memory CM is dead to any input pulse. With the "one" gate G3 open, the zero pulse passes into the courses memory CM and thereby energises relay RLB. This relay RLB is in association with the output relay logic indicated at ORL which in turn operates the card rack solenoid CRKS, which causes the feelers to lift and open circuts all in-put lines thereby releasing relay RLD and closing switch RLD1 causing the re-set generator RSG to return the courses decades CC to a set zero state. The inputs to the courses memory CM, the re-set generator RSG, and the courses decades CC, are all derived from the courses input switch lines "I."

In the operation of the controller for fashioning motion only instruction, the instruction is started and terminated by a card rack, in which the feelers 70 lift when the instruction has been completed. Starting from the beginning those feelers 70 which find holes, drop down so as to close their associated feeler switches. The gate G5 connected to relay RLE is energised whenever one out of the eight binary lines is returned to 0 volts, i.e. whenever there is a fashion instruction. Therefore whenever there is a fashion instruction, relay RLE is operated at the instant that the feelers fall, and closes the switch RLE1. A zero volt input is applied via the relay RLC contacts RLC1–8 which form the gates to the fashions decades FC. In addition, relay RLE is operated after a slight delay inherent in relay operation which operates relay RLC. Relay RLC operating, opens its contacts RLC1–8 and therefore opens the lines i.e. it gates the lines shut. The fashions decades FC now have stored on them the information from the card and are ready to count. Each machine operated fashions input pulse through line FL is shaped via the fashions input shaper FIS to a form suitable for counting on the fashions decades FC. This input pulse is fed to the fashions decades FC and to the fashions memory FM. The fashions decades FC count down to zero from the state set up by the feeler switches. At the state "one" i.e. one before the end of the instruction, the fashions "one" gate G6 is energised, and this opens the input line to the fashions memory FM such that the zero pulse can enter the fashions memory FM which is consequently switched to "On" and relay RLA is operated. This relay RLA in turn operates relay CRSR which in its turn causes the card rack solenoid to be energised and the feelers 70 to lift. It also causes relay RLE to release and hold the fashions decades re-set to zero, by returning the complements of the binary elements to a negative voltage via the relay RLC, this state being removed when relay RLE is operated returning the line to 0 volts.

In operation of the controller for combined course and fashioning motion instruction, the courses decades CC and the fashions decades FC will set from relay RLD contacts RLD1 and relay RLE contact RLE1 as explained in the previous two examples. There is one major difference in the further working here; between each fashion operation the courses decades CC must re-set to the state defined by the feeler switches CF. The card does not rack "on" between fashions but must wait until predetermined fashions of predetermined courses have been run off; this being so, the re-set generator is operated from a machine operated course pulse which is produced during the fashions cycle of the machine by virtue of the courses and fashions cycle switches CC1, CC2, being in parallel. In an example of four courses and three fashioning motions, the feelers 70 which are dropped instruct four courses to the courses decades CC and three fashioning motions to the fashions decades FC and the feelers 70 remain down until the three fashioning motions have been counted off. The input on the four courses line energises relay RLD causing the re-set generator to set the binary coded decades of the courses decades CC to the state of four through the contact RLD1. At the same time the three fashions input operates relay RLE which removes the set zero hold on the fashions decades FC and injects a state of three into the fashions decades. There is now set up, four courses and three fashions by relays RLD and RLE. The first courses pulse in line CL is received and puts the courses decades "CC" to the state of three. The second courses pulse takes the count down to two; the third pulse takes the count down to one. At this time the "one" gate G3 opens and the input line to the courses memory CM is active. On the zero pulse the courses memory CM is actuated causing relay RLB to operate which is routed by the output relay logic to the fashions solenoid FSS. The zero pulse also causes the counter decades to reach its state of zero. The fashions solenoid FSS has been energised and the machine goes into a dip; during the dip a fashions pulse is generated in line FL, stepping the fashions decades FC back to two; at the same time a course pulse is generated in line CL which is redundant so far as counting is concerned but is used to re-set the courses decades CC. This is done in the following manner with the courses decades CC at zero; the zero gate is energised and the input line to the re-set generator is active such that the next pulse, that is the minus one pulse, generated during the fashions cycle is injected into the re-set generator. The re-set generator is activated and generates output function into the courses decades CC and into the courses input gates G1, G2 of such a shape and duration as to re-set the existing courses information into the courses decades CC. Then we have the state where the courses decades CC have been re-set to four courses and the fashions decades FC have a state of two fashioning motions stored on them. The next four courses are counted off in exactly the same manner as previously, then going into the fashioning motion. When the second fashion pulse is generated accompanied by stepping the fashions decades FC back to one the redundant pulse generated during this fashioning motion re-sets once more the courses decades CC to the state then of the feeler switches. With the fashions decades at the state "one" the fashions "one" gate G6 is open; this activates the fashions memory input line such that the next fashions pulse passes into the fashions memory FM, activates relay RLA which in turn activates relay RLV which in its turn activates the card rack solenoid CRKS. The feelers 70 lift, removing all information from the input lines; therefore relays RLD and RLE release so that RLD contacts RLD1 operate for the re-set generator to cause a set zero hold to apply to the courses decades CC, relay RLE releasing causes the set zero hold to be applied to the fashions decades FC. This state continues for as long as the feelers 70 are lifted.

Figure 19:
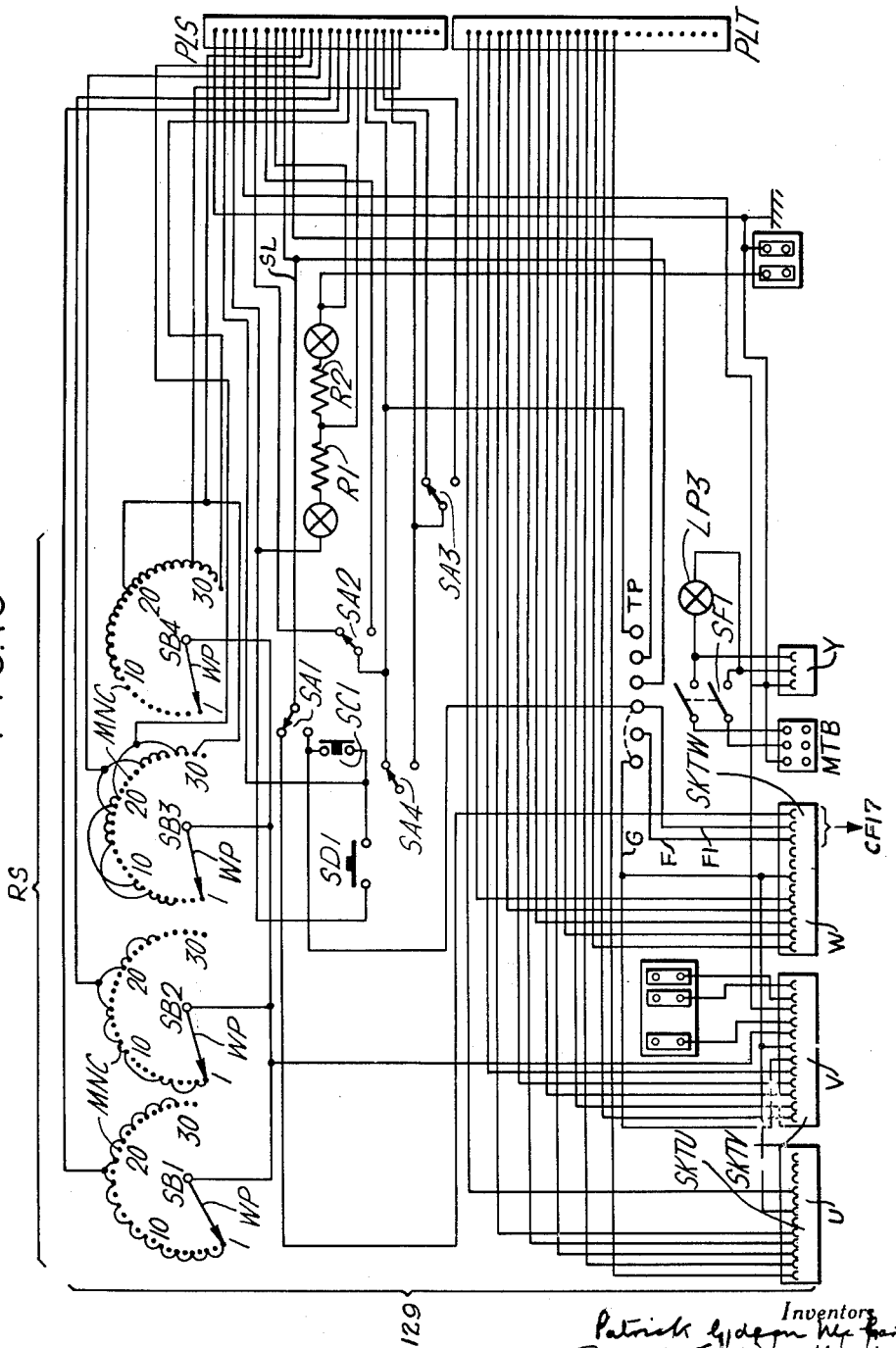
FIGURE 19 is a circuit diagram of a semi-manual control.

The control panel 129, as illustrated in detail in FIGURE 19, incorporates a thirty one position rotary switch RS having binary coded decimal contacts MNC with four pawls WP; this switch is connected into the binary coded decimal decades CC. The arrangement is under control of a manual start button SD1, a manual stop button SC1, and a two position rotary switch SA1 to 4.

In use of this arrangement, the rotary switch SA1 to 4 is first set to "manually" control and the rotary switch RS is then set to represent a required number of courses to be produced. The manual start button SD1 is pressed and this causes energising of the fashions solenoid FSS so that the machine goes directly into a dip.

During this operation, knock-off switch CMK is in control and when it is operated in the fashioning motion, relay circuitry is switched so that the normal operational sequence is followed except that the input is derived from the binary coded contacts MNC of the rotary switch RS. This rotary switch RS instructs the controller in exactly the same way as the card feeler switches and the sequence is exactly the same as for courses only operation but in this case the operator counts the number of fashioning motions. The manual instruction can be varied whilst the machine is running so long as the rotary switch RS is re-set during the courses operation not the fashioning motion. The manual mode is stopped by operating the manual stop button SC1, and it may be re-started again by the manual start button SD7, or switched over to automatic by operating the manual-automatic rotary switch SA1 to 4 back to the automatic.

The aforesaid feeler switch CF18 is used for obtaining additional courses to accommodate variations in the wool, tension, colour, humidity etc. The card will contain a hole in column G representative of where these courses are likely to occur. When this hole causes closing of switch CF18, this open circuits to the card controlled counter operating switches and brings rotary switch RS into circuit for this one row of the card. The operator can set a number by the rotary switch RS before it is actually required and the card automatically instructs, through the switch CF18, this number to be inserted from the control panel and not from the card.

The controller as described and illustrated is representative of the Ericsson Controller Type 309 wherein the appropriate circuitry is known by the following references of Ericsson Telephones Limited.

(a) Courses input gates—Cct. 120679 Sk.T.J. Cat. No. N880205; Cct. 120727 Skt.H. Cat. No. N880204
(b) Fashions information input gates—(contacts of relay RLC) Cat. No. N833488 SKT.R
(c) Binary coded decimal decades—(Cct. No. 120671) SKTK-L-M-N. Cat. No. N810001/A6
(d) Courses input and memory—Cct. 120678 SKT.F. Cat. No. N880207
(e) Fashions input and memory—(Cct. 120677) SKT.P. Cat. No. N880203
(f) Re-set generator—(Cct. 120680) SKT.G. Cat. No. 880206
(g) Relays—(Cct. No. 120676 SKT.R.) Cat. No. LH.309A/A1
(l) Control panel—Cat. No. N.800444; Cat. No. N120729
(k) Power supplies—Cct. No. 120812. Cat. No. N810001MG It will be understood that although the fashioning motions may be utilized for a number of operations, its main use is for shaping of the fabric by widening and narrowing, the control of the fashioning motions therefore constituting control of fashioning course frequency.

In addition to the card controlling the fashioning course frequency and other operations in fashioning motions, it can also instigate various mechanically controlled power operated mechanical operations of the machine.

For this purpose when an appropriate hole in the card causes operation of an appropriate one such as 70' or 70" of the feelers 70 in addition to other feeler operation for courses and fashionings, this mechanically causes connection between a latch and a bar, which latter is moved to and fro by each revolution of a cam on the cam shaft, thereby to transmit its motion during the production of a course or a fashioning motion to the particular mechanism as selected by the hole in the card. The operation which can be operated in following courses or fashioning motions, terminates in racking-on of the card because of the one or last course or fashioning motion operating the card rack solenoid CRKS.

More specifically, see FIGURES 7 and 9 in respect of two of the particular mechanisms there is a cam 80 on the main cam shaft 11 which operates, by each revolution of it, a cam follower lever 81 which is connected by linkage indicated generally at 82 to an arm 83 pivoted at 84 and carrying a bar 85, the bar 85 being consequently oscillated substantially horizontally in a lateral direction.

For releasable engagement with the bar 85 there are latches such as 86, 86$^1$ pivoted at 87 on arms 88, 88$^1$ which are pivoted at 89, and the arms 88, 88$^1$ are connected by links 90, 90$^1$ to the mechanisms desired to be operated.

The latches 86, 86$^1$ have abutment ends 91, 91$^1$ adjacent the bar 85, and tail ends 92, 92$^1$ underlying ends 93, 93$^1$ of levers 94, 94$^1$ which are pivoted at 95 and the other ends 96, 96$^1$ of each overlie ends of feelers 70$^1$, 70$^{11}$. Consequently if the feelers 70$^1$, 70$^{11}$ are not operated, the cam 80 will continue to move the bar 85 without having any effect on the link connections 90, 90$^1$ to the machine mechanisms.

But when there are holes in the card for said feelers 70$^1$, 70$^{11}$, the corresponding latch 86, 86$^1$ drops to present its abutment end 91, 91$^1$ in the path of the bar 85 whereupon the motion of the cam 80 is transmitted to the connecting link 90, 90$^1$ and consequently operates the required mechanism.

One such mechanism is conveniently the top disc control shaft 30, for which purpose one of the links 90 is connected by a lever 97 to a rod 98 (FIGURE 7) and the rod 98 extends into the machine section No. 6 (FIGURE 8) whereat it operates a link 99 through a bell crank lever 100 to produce a rack of the top disc control shaft 30. In the second instance, link 90$^1$ is connected by a lever 97$^1$ to a rod 98$^1$ which is connected to prop means 98$^{11}$ for propping out truck lever 26 to obtain bluffing of the selvedge stop screw racking independently of the top disc bluffing means 28 when required.

Figure 10:
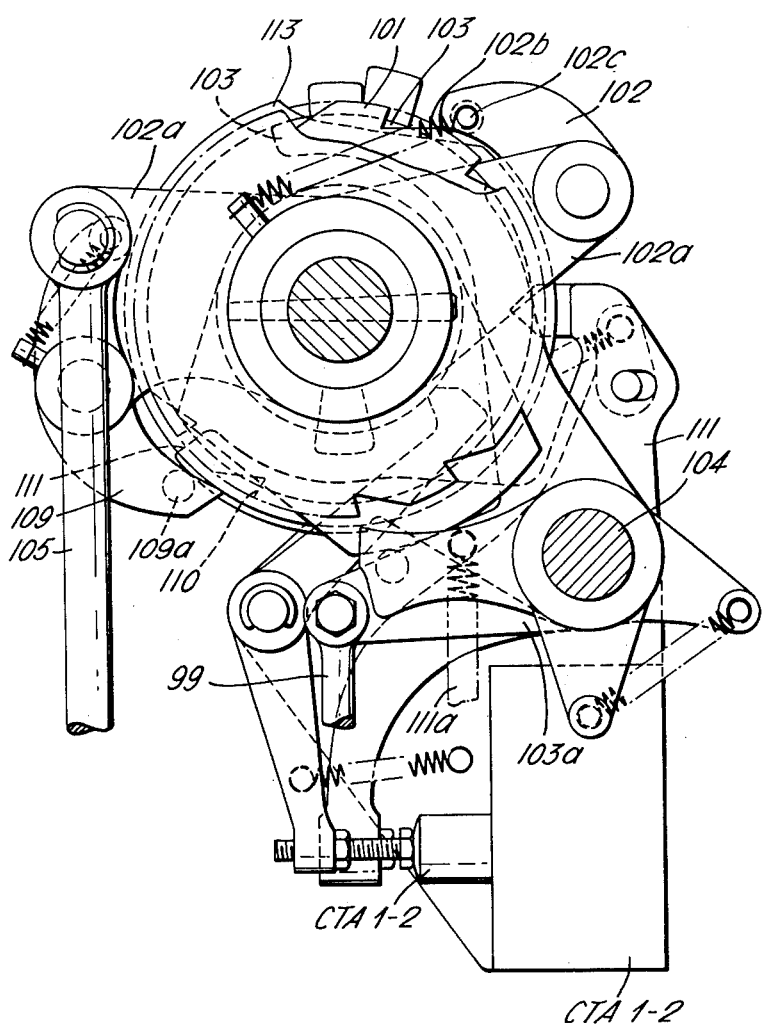
FIGURE 10 is a general perspective view of top disc control shaft mechanism.
Figure 11:
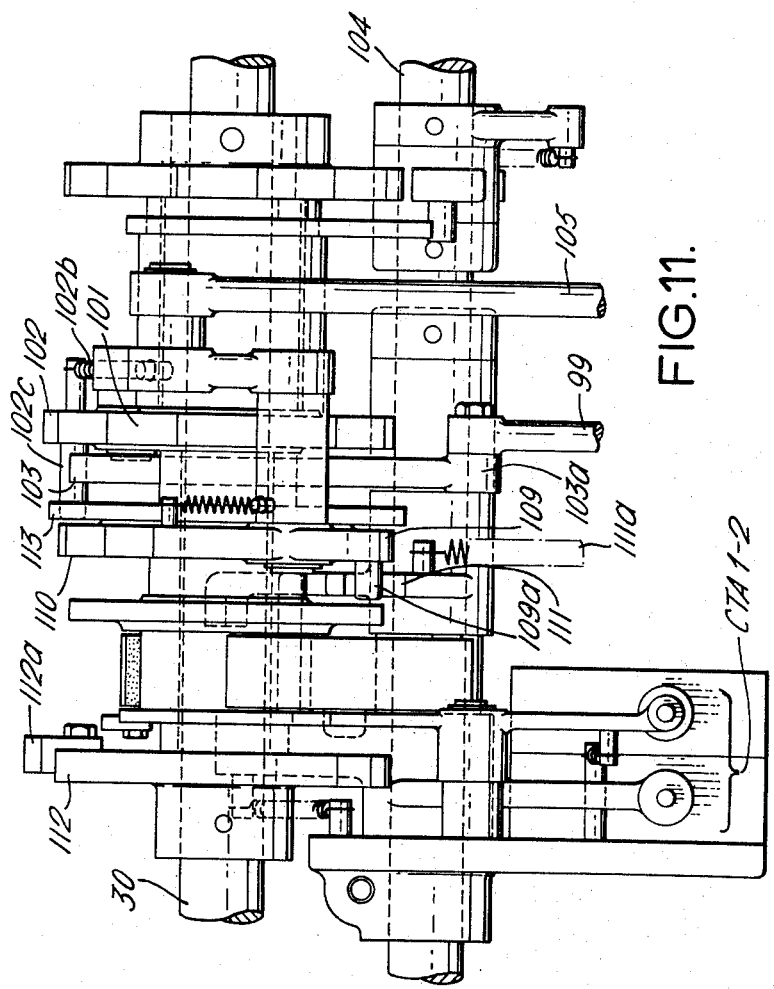
FIGURE 11 is a front view of the latter mechanism.

More specifically in the instance of the top disc shaft 30, it has secured on it a rack wheel 101, FIGURES 8, 10, 11 adapted to be operated by a pawl 102 which is carried by a lever 102a, FIGURE 10, pivoted on shaft 30 and is normally held against a spring 102b clear of the rack wheel 101 by a bluff lever 103 which extends in arcuate form from under a peg 102c on pawl 102 to a pivot shaft 104 and to a branch arm 103a of which there is connected said link 99. The lever 102a has also connected to it a link 105, the lower end of which is connected to a cam follower lever 106 having a wide roller 106a operable by each revolution of a cam 107, on the main cam shaft 11, in courses or fashioning motions.

Consequently when a hole in the card causes operation of said link 99 this displaces the bluff lever 103 and allows pawl 102 to rack shaft 30, the card being then racked on under control of the accompanying course and/or fashioning count.

One of the purposes of racking the top disc control shaft 30 is to instigate operation of a ravel course counter which provides for a required number of ravel courses to be produced without employing the counting means used for the other plain and fashioning courses, thereby allowing the card drum 46 to be back racked for repeat operation during some operation of the machine so as not to have an idle period.

Briefly, starting of the ravel courses is timed to take place at the right time by a pattern bit on a disc on the top disc shaft which, on one occasion when the top disc shaft is racked as already described, frees a pawl for racking a rack wheel freely on the top disc shaft through a complete revolution while ravel courses are made, the number of teeth or racks being predetermined according to the number of ravel courses required.

More specifically a pawl 109, FIGURES 8, 10, 11, is normally held clear of a ratchet-wheel 110, which is free on shaft 30, by a peg 109a on it being engaged by a bluff lever 111 which is biased by a spring 111a. There is also a pattern disc 112 (FIGURE 11) on shaft 30 having pattern bits 112a adapted for engaging the bluff lever 111. Consequently on the timed occasion when the top disc shaft 30 is racked and a pattern bit 112a is in correct position to simultaneously engage and displace the bluff lever 111, this allows pawl 109 to engage rack wheel 110. The pawl 109 is mounted on said lever 102a to which the cam-operated link 105 is connected so that a rack of rack wheel 110 results simultaneously with the next rack of shaft 30.

The next rack of shaft 30 is not effected from the card but instead, the bluff control link 99 is connected by the bell crank 100 (FIGURE 8) and said rod 98 through another bell crank lever 114 to another link 115 which is connected to a pattern disc follower lever 116 operable by a pattern bit 117a on pattern disc 117 on shaft 30; the arrangement is that the last rack on the shaft 30 from the card, which would normally terminate in link 99 rising to bluff the pawl 102, also causes the pattern bit 117a on disc 117 to raise link 115 and prevent the pawl 102 from being bluffed so that a second rack of shaft 30 results.

Connected to the rack wheel 110 on the shaft 30 there is a bluff disc 113 which co-operates with the peg 102c (in addition to the bluff lever 103) of the shaft racking pawl 102 and said second rack of shaft 30 together with the rack of rack wheel 110 results in the bluff disc 113 bluffing pawl 102 clear of its rack wheel 101. Thus the shaft 30 is stopped from racking but racking of rack wheel 110 continues through a revolution during which the necessary number of plain courses are made whereupon the bluff disc frees the pawl 102 for again racking shaft 30; whether or not shaft 30 then racks on depends upon the bit arrangement on pattern disc 117 and its control of bluff lever 103. The next rack of shaft 30 carries the pattern bit 112a clear of bluff lever 111 which consequently bluffs pawl 109 clear of the ravel rack wheel 110 to terminate the ravel course operation.

The aforesaid back racking of the card drum 46 is effected during the ravel course operation by the rack of the shaft 30, last to be effected before the ravel racks, causing a pattern bit 66a (FIGURE 7) on the said pattern disc 67, to reverse the card rack pawls 51, 52 as hereinbefore described. The back racking is terminated by the rack of shaft 30, first to follow the ravel racks, causing the pattern bit to restore the card rack pawls to "rack on" position.

Other particular mechanisms which are power operated mechanically under control of holes in the card are striping mechanism, V neck bluff mechanisms and marking screw bluff mechanism. For each of these mechanisms there is a duplicate of mechanisms 69, 70, 86, 87, 88. For the striping, the appropriate arm 88 is connected to lever 97$^2$ (FIGURE 7) by link 90$^2$ and lever 97$^2$ is connected by rod 98$^2$ to bluffing means shown generally at 130' (FIGURE 8) to control rack means 130$^2$ for a striping chain of known striping means. For the V neck bluff mechanism the appropriate arm 88 is connected to lever 97$^3$ (FIGURE 7) by link 90$^3$, and lever 97$^3$ is connected by rod 98$^3$ to propping means shown generally at 198 for propping out roller 199 from cam 200 to control racking mechanism indicated generally at 201, see FIG. 8 for V screws 202. For the marking screw bluff mechanism the appropriate arm 88 is connected to lever 97$^4$ by link 90$^4$, and lever 97$^4$ is connected by rod 98$^4$ and link 203 to bluff means shown generally at 204 for bluff control of racking screws 205 of known marking mechanisms.

It is to be understood that although the controller is described as being of transistorized kind, other suitable forms of control means may be employed for example in which the counters are of Uniselector type, or in which Dekatron valves are used.

It is further to be understood that the programming control means may be applied according to the invention, modified to suit requirements, to knitting machines other than straight bar knitting machines; for example it may be applied to a circular hose machine suitably modified to control the course arrangement of different rib formations, and other machine operations in respect say of the foot; or in other circular knitting machine suitably modified to control say the course arrangement of courses patterned by patterning stitches.

It is also to be noted that in the instance of the straight bar knitting machine, the single programming arrangement controls a plurality of articles produced in the different knitting sections.

In a somewhat equivalent manner, a single programming arrangement can be suitably modified and employed to control the production of articles on a plurality of separate machines say circular knitting machines such that all machines produce identical articles under control of the one programming arrangement.

What we claim is:

1. A straight bar knitting machine having a programming arrangement comprising a programming chart embodying rows and columns of detectable indications of numbers of courses and numbers of fashionings, a chart-reader adapted for reading the rows of indications successively and, for passing on information given by the indications, a pair of actuators one for initiating fashionings and the other for initiating the successive readings, control means comprising a course counter, a reset generator therefor, and a fashions counter, all co-related to receive information from the chart-reader according to the instructions of the chart's indications, means associated with the machine's main cam shaft for operating the counters in step with course and fashion-producing revolutions of the main cam shaft, and means operable by terminal operations of the counters to cause operation of said actuators appropriately to automatically carry out required course frequencies of fashionings.

2. A machine as claimed in claim 1 wherein the chart is of forward racked kind and is back-racked for repeat operation, the chart includes indications representative of machine operations including racking of a top disc shaft in addition to course and fashioning operations, detection of the latter indications causes coupling of mechanism for said other operations to power operated means so that in the instance of the top disc shaft this is racked on, and on the top disc shaft there is a ravel course counter which is caused by an appropriate rack of the top disc shaft to operate and count for ravel courses during the back-racking of the chart and avoid waste of production time.

3. A machine as claimed in claim 2 wherein said other machine operations consist of such operations as stopping the machine motor, operating a striping chain, cancelling a V neck screw operation, cancelling a main screw operation, racking an auto shaft, and cancelling a racking screw operation.

4. In a knitting machine, a programming control arrangement comprising a manually operable selector for numbers of courses and adapted to pass on numerical information, a course counter adapted to receive said information, means for operating the course counter with a frequency in step with course-producing operations of the machine an actuator operable by terminal operation of the counter to initiate another machine operation, primarily fashioning in a straight bar knitting machine, and automatic re-set means for the course counter thereby enabling any course frequency of operation of said other operation to be produced, the operation being under manual start and stop switch control.

5. A knitting machine having knitting elements, operating means associated with the knitting elements for operating them to successively produce plain courses of knitted fabric, modified operating means associated with the knitting elements for operating them with a modified motion, and programming control means comprising counting means associated with said operating means for counting in synchronism with the course-producing cycle of the machine to count for the plain knitted courses and for the modified motions, a programming device comprising a programming chart having readable indications including some for the plain knitted courses and others for the modified motions, and reader means associated with the chart for reading the indications, actuator means comprising a programming actuator associated with the counting means and also with the programming device for operation upon termination of a predetermined count as dictated by a plain knitted course indication to instigate advance from one reading to the next, and a modified motion actuator associated with the counting means and also with the modified operating means for operation upon termination of a predetermined count as dictated by a modified motion indication to instigate a modified motion, and means associated with the programming device for certain readings to be of both kinds of indications simultaneously, each indication being of any predetermined numerical value within a predetermined wide range, whereby the modified motion can be obtained at any course frequency within a wide range from a chart which is of comparatively small dimensions.

6. A full fashioned knitting machine having in combination, knitting needle bars; cam operated means for operating the needle bars to produce plain knitted courses of fabric; fashioning means comprising fashioning cams, shogging means for rendering the fashioning cams operative and inoperative, and patterning mechanism operable for widening and narrowing by loop transference; and programming control means comprising, counting means operated in synchronism with the course cycle for counting courses and fashionings, actuator means operable by predetermined operations of the counting means to instigate operations of the shogging means for fashionings, and a programming device pre-arranged with necessary course and fashionings information and to correspondingly control the counting means and said patterning mechanism, whereby desired course frequency of fashioning is obtainable automatically from a programming chart.

7. A full fashioned knitting machine having in combination, knitting needle bars, cam operated means for operating the needle bars to produce knitted courses of fabric, shogging means for obtaining fashioning motions of the machine, a narrowing head, and miscellaneous mechanisms operable for various purposes including pattern control mechanism for controlling said narrowing head to fashion during the fashioning motions, and programming control means for controlling the course frequency of fashioning and of operation of said miscellaneous mechanisms comprising, a programming chart having course, fashioning motion, and miscellaneous indications set out selectively in rows and with the course and fashioning motions indications being in accordance with the Binary Coded Decimal system, electric reader means arranged for reading the indications and for passing on information in accordance with the readings including numerical signals from the course and fashioning motion indications, an electric operations controller having electric counting means to be set by the numerical signals from readings of the course and fashioning motion indications, count cam operated means for operating the counting means to count for courses and fashioning motions in synchronism with the machine's course cycle, electric actuator means operable from the counting means to operate the shogging means for obtaining the fashioning motions and to cause advances from reading to reading, and mechanical means operable from the miscellaneous indications to operate said miscellaneous mechanisms including said pattern control mechanism for fashioning during the fashioning motions.

8. A knitting machine having, in combination with first operating means for the machine's knitting course-producing motions and at least second operating means for modified different motions of the machine, programming control means comprising first course counting means for counting stepwise said course-producing motions, and second counting means for counting stepwise said different modified motions, actuator means for the second operating means under control of the counting means, instructional detector means successively operated to instruct said first and second counting means selectively and jointly by which the first operating means and the actuator means for the second operating means are controlled, from stored information, and a program carrier carrying the stored information in the form of spaced control points having a wide range of different numerical values in respect of the different motions.

9. A knitting machine having, in combination with first operating means for the machine's knitting course-producing motions, also second operating means for modified different motions of the machine, and further operating means including at least third operating means for an auxiliary motion associated with the modified different motion, programming control means comprising first course counting means for counting stepwise said course-producing motions, and second counting means for counting stepwise said different modified motions, actuator means including at least an actuator for the second operating means under control of the counting means and actuator means for the further operating means including at least a second actuator for the third operating means, instructional detector means successively operated to instruct said first and second counting means selectively and jointly, by which the knitting motions and the actuator for the second operating means are controlled and to instruct the actuator means for the further operating means by which at least the second actuator for the third operating means is controlled, from stored information, and a program carrier carrying the stored information in the form of spaced control points having a wide range of different numerical values in respect of the different motions and derived from a suitable numerical code.

10. A straight bar knitting machine having, in combination with operating means for the machine's knitting motion, cam shaft shogging means for the fashioning motion of the machine, and further operating means including at least narrowing and widening adjustment means for the narrowing and widening adjustment motion associated with the fashioning, programming control means comprising counting means for counting the knitting motions and the fashioning motions, actuator means including at least an actuator for the cam shaft shogging means under control of the counting means for the fashioning motions and actuator means for the further operating means including at least a second actuator for the narrowing and widening adjustment means, instructional detector means successively operated to instruct the counting means selectively and jointly, by which the knitting motions and the actuator for the cam shaft shogging means are controlled and to instruct the actuator means for the further operating means by which at least the second actuator for the narrowing and widening adjustment means is controlled, from stored information, and a program carrier carrying the stored information in the form of spaced control points having a wide range of different numerical values in respect of the different motions and derived from a Binary based code.

References Cited in the file of this patent

UNITED STATES PATENTS

| 2,731,572 | Cobert | Jan. 17, 1956 |
| 3,035,426 | MacQueen | May 22, 1962 |

FOREIGN PATENTS

| 560,188 | Belgium | Sept. 14, 1957 |